US008077258B2

(12) United States Patent
Take et al.

(10) Patent No.: US 8,077,258 B2
(45) Date of Patent: Dec. 13, 2011

(54) IMAGE DISPLAY APPARATUS, SIGNAL PROCESSING APPARATUS, IMAGE PROCESSING METHOD, AND COMPUTER PROGRAM PRODUCT

(75) Inventors: Masahiro Take, Kanagawa (JP); Shoji Kosuge, Kanagawa (JP)

(73) Assignee: Sony Corporation, Tokyo (JP)

( * ) Notice: Subject to any disclaimer, the term of this patent is extended or adjusted under 35 U.S.C. 154(b) by 1254 days.

(21) Appl. No.: 11/800,743

(22) Filed: May 7, 2007

(65) Prior Publication Data

US 2007/0263121 A1 Nov. 15, 2007

(30) Foreign Application Priority Data

May 9, 2006 (JP) ................................ P2006-130682

(51) Int. Cl.
*H04N 7/08* (2006.01)

(52) U.S. Cl. ........................................................ 348/448

(58) Field of Classification Search .................. 348/448, 348/441, 449, 458, 459, 607, 609, 667, 678
See application file for complete search history.

(56) References Cited

U.S. PATENT DOCUMENTS

| | | | | |
|---|---|---|---|---|
| 6,201,798 | B1 * | 3/2001 | Campanella et al. | 370/326 |
| 6,466,268 | B1 * | 10/2002 | Kato et al. | 348/383 |
| 6,473,066 | B1 * | 10/2002 | Okuzono | 345/87 |
| 6,731,818 | B1 * | 5/2004 | Conklin | 382/254 |
| 7,071,874 | B2 * | 7/2006 | Doi | 342/377 |
| 7,098,884 | B2 * | 8/2006 | Onoya | 345/96 |
| 7,764,258 | B2 * | 7/2010 | Kitamura et al. | 345/96 |
| 7,821,481 | B2 * | 10/2010 | Take et al. | 345/96 |
| 2003/0038766 | A1 * | 2/2003 | Lee et al. | 345/87 |

FOREIGN PATENT DOCUMENTS

| | | |
|---|---|---|
| JP | 8 98154 | 4/1996 |
| JP | 2002 351382 | 12/2002 |
| JP | 2003 308528 | 10/2003 |
| JP | 2005-128488 | 5/2005 |
| JP | 2005 141209 | 6/2005 |
| JP | 2005-173387 | 6/2005 |
| JP | 2005 227744 | 8/2005 |
| JP | 2005 241787 | 9/2005 |

* cited by examiner

*Primary Examiner* — Paulos Natnael

(74) *Attorney, Agent, or Firm* — Frommer Lawrence & Haug LLP; William S. Frommer; Ellen Marcie Emas

(57) ABSTRACT

An image display apparatus includes the following elements. An IP converter performs signal conversion processing for converting an interlace signal into a progressive signal including information on interpolated pixels. A frame controller temporally divides an input image frame to generate a plurality of sub-frames. A high-frequency-enhanced sub-frame generator and a high-frequency-suppressed sub-frame generator perform filtering processing on the sub-frames to generate high-frequency-enhanced sub-frames and high-frequency-suppressed sub-frames, respectively. A first output controller alternately outputs the high-frequency-enhanced sub-frames and the high-frequency-suppressed sub-frames. A gain controller adjusts an output level of the sub-frames. A second output controller receives an output from the first output controller and an output from the gain controller to output an output-level-adjusted signal as a signal corresponding to the interpolated pixels and outputs an output-level non-adjusted signal as an original pixel signal. A display unit performs frame-hold-type display processing and alternately displays the high-frequency-enhanced sub-frames and the high-frequency-suppressed sub-frames.

15 Claims, 14 Drawing Sheets

IMAGE DISPLAY APPARATUS, SIGNAL PROCESSING APPARATUS, IMAGE PROCESSING METHOD, AND COMPUTER PROGRAM PRODUCT

CROSS REFERENCES TO RELATED APPLICATIONS

The present invention contains subject matter related to Japanese Patent Application JP 2006-130682 filed in the Japanese Patent Office on May 9, 2006, the entire contents of which are incorporated herein by reference.

BACKGROUND OF THE INVENTION

1. Field of the Invention

The present invention generally relates to image display apparatuses, signal processing apparatuses, image processing methods, and computer program products. More particularly, the invention relates to an image display apparatus that can reduce the occurrence of blurring phenomenon by performing interlace-to-progressive (IP) conversion for converting interlace signals into progressive signals when displaying images on a frame-hold-type display, such as a liquid crystal display (LCD). The invention also relates to a signal processing apparatus, an image processing method, and a computer program product used in the image display apparatus.

2. Description of the Related Art

In display processing utilizing flat panel displays (FPDS) using organic electroluminescence (EL) or liquid crystals (LCs), frame-hold-type display is performed, unlike cathode ray tubes (CRTs) employing dot-sequential impulse driving display. That is, in a typical FPD operating, for example, at a frame frequency of 60 Hz, during every display period (1/60 sec=16.7 msec) of one frame, the same image is continuously displayed (held) on the whole display screen.

In such frame-hold-type display, image blurring occurs due to afterimage remaining on the retina. More specifically, when displaying a moving object on a frame-hold-type display, such as an FPD, the image picked up by the retina appears to jump while the eye is following the displayed moving object, which makes the moving object appear blurred. Because of this blurring, the quality of moving pictures is deteriorated.

As one measure to reduce the occurrence of blurring phenomenon, a so-called “black insertion” technique has been proposed. In this black insertion technique, a high-speed-response display device operating, for example, at a frame frequency of 120 Hz, is employed, and an actual display image is first displayed in a period of 1/120 sec, and a black color is displayed in the next 1/120-sec period, and then, another actual display image is displayed in the next 1/120-sec period, and then, a black color is displayed in the next 1/120-sec period. That is, by the insertion of a black color between frames to be displayed, the FPD is allowed to perform pseudo-impulse-driving operation. By simply inserting a black color frame, however, the brightness of the display image including the black color is integrated on the retina of a viewer, which reduces the brightness or contrast level of the display image.

To solve this problem, for example, the following configuration has been proposed in Japanese Patent Unexamined Application Publication No. 2005-128488. In this configuration, the rate is increased by n times (xn), and then, a video signal having a luminance level lower than that of the original frame is inserted as a sub-frame, so that a trade-off relationship between the impulse driving and the brightness or contrast can be implemented.

Japanese Patent Unexamined Application Publication No. 2005-173387 discloses another configuration. In this configuration, a video signal in the period of one frame is divided into a plurality of sub-frames in a time division manner, and then, the allocation of luminance components among the divided sub-frames is adjusted so that the integrated luminance obtained by integrating the luminance components of the divided sub-frames is comparable to the luminance of the original frame. As a result, pseudo-impulse driving can be implemented without impairing the brightness level.

In the configuration disclosed in Japanese Patent Unexamined Application Publication No. 2005-128488, however, there is a tradeoff relationship between impulse driving and the brightness or contrast, and it is difficult to avoid a decrease in the brightness or contrast to a certain extent. In the configuration disclosed in Japanese Patent Unexamined Application Publication No. 2005-173387, even if a suitable allocation of luminance components among the time-divided sub-frames is performed, a sufficient effect may not be obtained, depending on the luminance level of the pixels of the original frame. Additionally, it is necessary to set time-divided frames having pixel values with luminance levels lower than the luminance levels of the pixel values forming the original image, in which case, if the luminance levels of the pixels of the original frames are low, it is difficult to set time-divided frames having suitable pixel values.

Currently, most of the content pieces or broadcast signals used for displaying images are generated as image data in accordance with the CRT-compatible interlace driving. More specifically, one image to be displayed in the horizontal scanning lines of a CRT display is divided into two fields, and in one field, every other horizontal scanning line is scanned from the top to the bottom, and then, in the other field, the remaining horizontal scanning lines that have not been scanned are scanned from the top to the bottom, so that the entire image can be displayed. There are many interlace image content pieces that are generated as discussed above. That is, repeatedly scanning every other horizontal scanning line from the top to the bottom generates one image.

If such interlace image content is displayed on a frame-hold-type display device, lines associated with display image signals and lines not being associated with display image signals are alternately generated, and flicker becomes noticeable, and also, the luminance level is reduced. To solve this problem, an interlace signal is converted into a progressive signal, and then, the image is displayed. As stated above, processing for converting an interlace signal into a progressive signal is referred to as “IP conversion”.

Generally, in a CRT display, scanning every other horizontal scanning line from the top to the bottom of a screen is referred to as “interlace scanning”, while sequentially scanning a plurality of horizontal scanning lines (horizontal display lines) forming the screen line by line is referred to as “progressive scanning” (sequential scanning). In the progressive scanning, pixel signals corresponding to all the scanning lines are provided.

In IP conversion for converting interlace signals into progressive signals, lines not being associated with signals contained in the interlace signals are generated by interpolation processing. By the application of pseudo-signals generated by this interpolation processing, interlace signals can be converted into progressive signals including information on all the pixels.

The interpolation processing used in the IP conversion is performed on the basis of the pixel values of surrounding pixels adjacent to existing pixels in the spatial or temporal direction. In many cases, pixel values similar to those of surrounding pixels are set for pixels to be interpolated. This accelerates the above-described blurring phenomenon.

In the IP conversion for converting interlace signals into progressive signals, the pixel values of pseudo-pixels are estimated and determined on the basis of the pixels values of the surrounding pixels in the spatial or temporal direction. Accordingly, users have to view content partially replaced by pseudo-pixel values, which is annoying for users who desire the faithful playback of original content.

SUMMARY OF THE INVENTION

It is thus desirable to provide an image display apparatus, a signal processing apparatus, an image processing method, and a computer program product in which image blurring occurring in frame-hold-type displays, such as liquid crystal displays, is suppressed without impairing the brightness or contrast level.

It is also desirable to provide an image display apparatus, a signal processing apparatus, an image processing method, and a computer program product in which original content can be faithfully played back and displayed by means of the display control of pixels interpolated during IP conversion.

More specifically, it is also desirable to provide an image display apparatus, a signal processing apparatus, an image processing method, and a computer program product in which the occurrence of blurring phenomenon is suppressed without impairing the brightness or contrast level by dividing an input image into sub-frames and by then alternately outputting high-frequency-enhanced sub-frames in which high-frequency image areas, such as portions where contrast changes sharply (edges) and outlines, are enhanced, and high-frequency-suppressed sub-frames in which the high-frequency areas are suppressed, and in which display control of pixels interpolated during IP conversion is implemented through gain control performed on the outputs of the interpolated pixels to allow the faithful playback of original content while allowing a progressive signal including information on interpolated pixels to be displayed.

According to an embodiment of the present invention, there is provided an image display apparatus for performing image display processing. The image display apparatus includes an IP converter configured to perform signal conversion processing for receiving an interlace signal to convert the interlace signal into a progressive signal including information on interpolated pixels generated by interpolation processing, a frame controller configured to divide an input image frame in a time-division manner to generate a plurality of sub-frames, a high-frequency-enhanced sub-frame generator configured to perform filtering processing on the plurality of sub-frames generated by the frame controller to generate high-frequency-enhanced sub-frames, a high-frequency-suppressed sub-frame generator configured to perform filtering processing on the plurality of sub-frames generated by the frame controller to generate high-frequency-suppressed sub-frames, a first output controller configured to alternately output the high-frequency-enhanced sub-frames generated by the high-frequency-enhanced sub-frame generator and the high-frequency-suppressed sub-frames generated by the high-frequency-suppressed sub-frame generator, a gain controller configured to adjust an output level of sub-frame images corresponding to the high-frequency-enhanced sub-frames and the high-frequency-suppressed sub-frames output from the first output controller, a second output controller configured to receive an output from the first output controller and an output from the gain controller to output an output-level-adjusted signal output from the gain controller as a signal corresponding to the interpolated pixels generated by the IP converter and to output an output-level non-adjusted signal output from the first output controller as an original pixel signal other than the signal corresponding to the interpolated pixels, and a display unit configured to perform frame-hold-type display processing and to alternately display the high-frequency-enhanced sub-frames and the high-frequency-suppressed sub-frames output from the second output controller.

The image display apparatus may further include a user input unit configured to input a setting value for setting the output level to be adjusted in the gain controller. The gain controller may adjust the output level of the sub-frame images in accordance with the setting value input through the user input unit.

The gain controller may adjust the output level of the sub-frame images in a range from ×0 to ×1.

The high-frequency-enhanced sub-frame generator may include a high-pass filter and an add processor, and may output, as the high-frequency-enhanced sub-frames, an addition result obtained by adding sub-frames obtained by performing filtering on the plurality of sub-frames with the high-pass filter to the sub-frames not subjected to the filtering.

The high-frequency-suppressed sub-frame generator may include a low-pass filter and may output a result of performing filtering on the plurality of sub-frames with the low-pass filter as the high-frequency-suppressed sub-frames.

The high-pass filter forming the high-frequency-enhanced sub-frame generator and the low-pass filter forming the high-frequency-suppressed sub-frame generator may each have a filtering characteristic such that, among frequency components, a proportion of the frequency components allowed to pass through the high-pass filter or the low-pass filter is equal to a proportion of the frequency components blocked by the low-pass filter or the high-pass filter.

The frame controller may divide a 60-Hz image frame as an input image into two sub-frames to generate 120-Hz image sub-frames. The high-frequency-enhanced sub-frame generator and the high-frequency-suppressed sub-frame generator may generate the high-frequency-enhanced sub-frames and the high-frequency-suppressed sub-frames, respectively, corresponding to the 120-Hz image sub-frames generated by the frame controller. The display unit may alternately display the high-frequency-enhanced sub-frames and the high-frequency-suppressed sub-frames at intervals of 1/120 sec.

The display unit may be a frame-hold-type display unit that performs frame-hold-type display utilizing a liquid crystal display or an organic electroluminescence display.

According to another embodiment of the present invention, there is provided a signal processing apparatus for generating an image signal. The signal processing apparatus may include an IP converter configured to perform signal conversion processing for receiving an interlace signal to convert the interlace signal into a progressive signal including information on interpolated pixels generated by interpolation processing, a frame controller configured to divide an input image frame in a time-division manner to generate a plurality of sub-frames, a high-frequency-enhanced sub-frame generator configured to perform filtering processing on the plurality of sub-frames generated by the frame controller to generate high-frequency-enhanced sub-frames, a high-frequency-suppressed sub-frame generator configured to perform filtering processing on the plurality of sub-frames generated by the frame controller to generate high-frequency-suppressed sub-frames, a first output controller configured to alternately output the high-frequency-enhanced sub-frames generated by the high-frequency-enhanced sub-frame generator and the high-frequency-suppressed sub-frames generated by the high-frequency-suppressed sub-frame generator, a gain controller configured to adjust an output level of sub-frame images corresponding to the high-frequency-enhanced sub-frames and the high-frequency-suppressed sub-frames output from the first output controller, and a second output controller configured to receive an output from the first output controller and an output from the gain controller to output an output-level-adjusted signal output from the gain controller as a signal corresponding to the interpolated pixels generated by the interlace-to-progressive converter and to output an output-level non-adjusted signal output from the first output controller as an original pixel signal other than the signal corresponding to the interpolated pixels.

The gain controller may adjust the output level of the sub-frame images in accordance with a setting value input through a user input unit.

The gain controller may adjust the output level of the sub-frame images in a range from ×0 to ×1.

The high-frequency-enhanced sub-frame generator may include a high-pass filter and an add processor, and may output, as the high-frequency-enhanced sub-frames, an addition result obtained by adding sub-frames obtained by performing filtering on the plurality of sub-frames with the high-pass filter to the sub-frames not subjected to the filtering.

The high-frequency-suppressed sub-frame generator may include a low-pass filter and may output a result of performing filtering on the plurality of sub-frames with the low-pass filter as the high-frequency-suppressed sub-frames.

According to another embodiment of the present invention, there is provided an image processing method for performing image processing in an image display apparatus. The image processing method includes the steps of performing signal conversion processing for receiving an interlace signal to convert the interlace signal into a progressive signal including information on interpolated pixels generated by interpolation processing, dividing an input image frame in a time-division manner to generate a plurality of sub-frames, generating high-frequency-enhanced sub-frames by performing filtering processing on the plurality of sub-frames, generating high-frequency-suppressed sub-frames by performing filtering processing on the plurality of sub-frames, alternately outputting the high-frequency-enhanced sub-frames and the high-frequency-suppressed sub-frames, adjusting an output level of sub-frame images corresponding to the high-frequency-enhanced sub-frames and the high-frequency-suppressed sub-frames, and receiving an output as a result of alternately outputting the high-frequency-enhanced sub-frames and the high-frequency-suppressed sub-frames and an output of the sub-frame images having an adjusted output level to output an output-level-adjusted signal as a signal corresponding to the interpolated pixels and to output an output-level non-adjusted signal as an original pixel signal other than the signal corresponding to the interpolated pixels.

According to another embodiment of the present invention, there is provided a computer program product allowing an image display apparatus to perform image processing. The image processing includes the steps of performing signal conversion processing for receiving an interlace signal to convert the interlace signal into a progressive signal including information on interpolated pixels generated by interpolation processing, dividing an input image frame in a time-division manner to generate a plurality of sub-frames, generating high-frequency-enhanced sub-frames by performing filtering processing on the plurality of sub-frames, generating high-frequency-suppressed sub-frames by performing filtering processing on the plurality of sub-frames, alternately outputting the high-frequency-enhanced sub-frames and the high-frequency-suppressed sub-frames, adjusting an output level of sub-frame images corresponding to the high-frequency-enhanced sub-frames and the high-frequency-suppressed sub-frames, and receiving an output as a result of alternately outputting the high-frequency-enhanced sub-frames and the high-frequency-suppressed sub-frames and an output of the sub-frame images having an adjusted output level to output an output-level-adjusted signal as a signal corresponding to the interpolated pixels and to output an output-level non-adjusted signal as an original pixel signal other than the signal corresponding to the interpolated pixels.

The computer program product can be provided as a computer-readable storage medium, such as a compact disc (CD), a floppy disk (FD), or a magneto-optical (MO) disk, for providing various program codes to a general-purpose computer that can execute various program codes, or a communication medium, such as a network. Then, processing corresponding to a program can be executed on a computer system.

Further features and advantages of the present invention will become apparent from the following description of exemplary embodiments with reference to the attached drawings.

According to an embodiment of the present invention, high-frequency-enhanced sub-frames and high-frequency-suppressed sub-frames are generated on the basis of sub-frames generated by dividing a frame in a time-division manner, and are alternately displayed at regular intervals of, for example, 1/120 sec. Additionally, the display level of the interpolated pixels generated during IP conversion is set to be adjustable in a range of ×0 to ×1. With this configuration, images can be displayed while suppressing the occurrence of blurring phenomenon without impairing the brightness or contrast level. That is, a high-frequency-suppressed sub-frame in which a high-frequency image area where image blurring is noticeable, such as portions where the contrast sharply changes (edges) and outlines, is suppressed is displayed between high-frequency-enhanced sub-frames. As a result, the occurrence of blurring phenomenon can be reduced. Also, the high-frequency-enhanced sub-frames can compensate for the influence of the insertion of high-frequency-suppressed sub-frames on the image quality, e.g., a decreased level of contrast. Thus, images can be displayed without impairing the brightness or contrast level.

According to an embodiment of the present invention, the display level of the interpolated pixels generated during IP conversion is set to be adjustable in a range of ×0 to ×1. It is thus possible to allow the faithful playback of original content by reducing the display level of the interpolated pixels while allowing a progressive signal including information on the interpolated pixels to be displayed.

DESCRIPTION OF THE PREFERRED EMBODIMENTS

Details of an image display apparatus, a signal processing apparatus, an image processing method, and a computer program product according to an embodiment of the present invention are described below with reference to the accompanying drawings. Descriptions thereof are given in the following order.

1. Blurring Phenomenon
2. IP Conversion
3. Details of Configuration and Processing of Apparatus 1. Blurring Phenomenon A blurring phenomenon occurring in frame-hold-type displays, such as liquid crystal displays, is first discussed below. As stated above, in a frame-hold-type display device, the blurring phenomenon in which a moving object to be displayed appears blurred, i.e., motion blurring caused by after-image remaining on the retina, occurs. This phenomenon is discussed below with reference to FIG. 1.

When observing a moving object in a moving picture displayed on a display, an observer smoothly follows the feature points of the moving object. On an FPD using a liquid crystal or an organic EL performing frame-hold-type display, the same image is continuously displayed during one frame. If a frame-hold-type display is operated, for example, at a frame frequency of 60 Hz, one fixed image is continuously displayed during a display period of one frame (1/60 sec=16.7 msce), and one frame image is switched to another frame image every 1/60 sec. While observing an image displayed on such a frame-hold-type display, the moving object held during one frame and picked up by the retina appears to jump, which is recognized as a so-called "blurring phenomenon" such as image blurring or motion blur.

Figure 1:
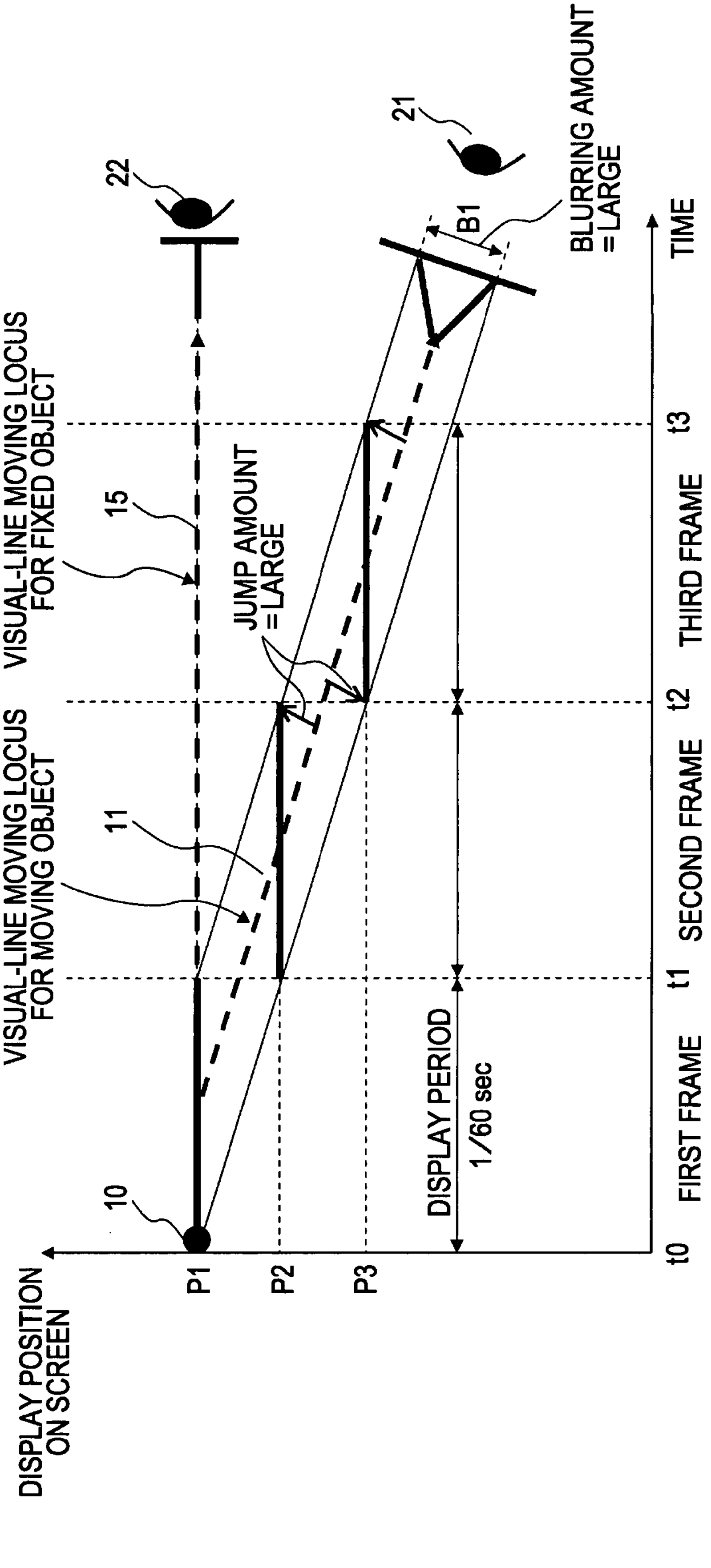
FIG. 1 illustrates the occurrence of blurring in a frame-hold display apparatus.

FIG. 1 illustrates the blurring phenomenon. The graph shown in FIG. 1 illustrates a time transition of display data in a frame-hold-type display device. The horizontal axis represents the temporal direction, while the vertical axis designates the position of an object moving on the screen. In the frame-hold-type display, as stated above, one image is continuously displayed during a display period of one frame (1/60 sec=16.7 msec). The display time of the first frame is t0 to t1, the display time of the second frame is t1 to t2, and the display time of the third frame is t2 to t3. The display period of each frame is 1/60 sec.

If an object 10 is moving at an equal speed, the display position of the object 10 in the display period from t0 to t1 of the first frame is fixed at P1, and at the switching timing t1 of the subsequent frame, the display position of the object 10 is drastically shifted from P1 to P2, and the display position of the object 10 in the display period from t1 to t2 of the second frame is fixed at P2. Then, at the next switching timing t2, the display position of the object 10 is drastically shifted from P2 to P3, and the display position is fixed at P3 in the display period from t2 to t3 of the third frame.

While observing the object 10, a user follows the object 10 along a visual-line moving locus 11 shown in FIG. 1. However, the display position of the moving object 10 on the screen is different from the visual-line moving locus 11. At time t2, for example, when the second frame is switched to the third frame, the display position of the object 10 is switched from P2 to P3, and accordingly, the image of the object 10 viewed by the user has a large amount of jump. As a result, image blurring corresponding to the amount of image jump, i.e., blurring phenomenon, occurs. To the retina of a user 21 shown in FIG. 1, the image of the moving object 10 appears like an object having a large amount of blurring extending in an area B1 shown in FIG. 1.

On the other hand, if the object 10 is located at a fixed position on the screen, i.e., if the image 10 is fixed at P1 during the display periods of the first through third frames, a user 22 shown in FIG. 1 observes the image of the object 10 at the fixed position, and thus, a visual-line moving locus 15 is constant. To the retina of the user 22, the image of the object 10 appears like a clear image without the occurrence of blurring phenomenon.

Figure 2:
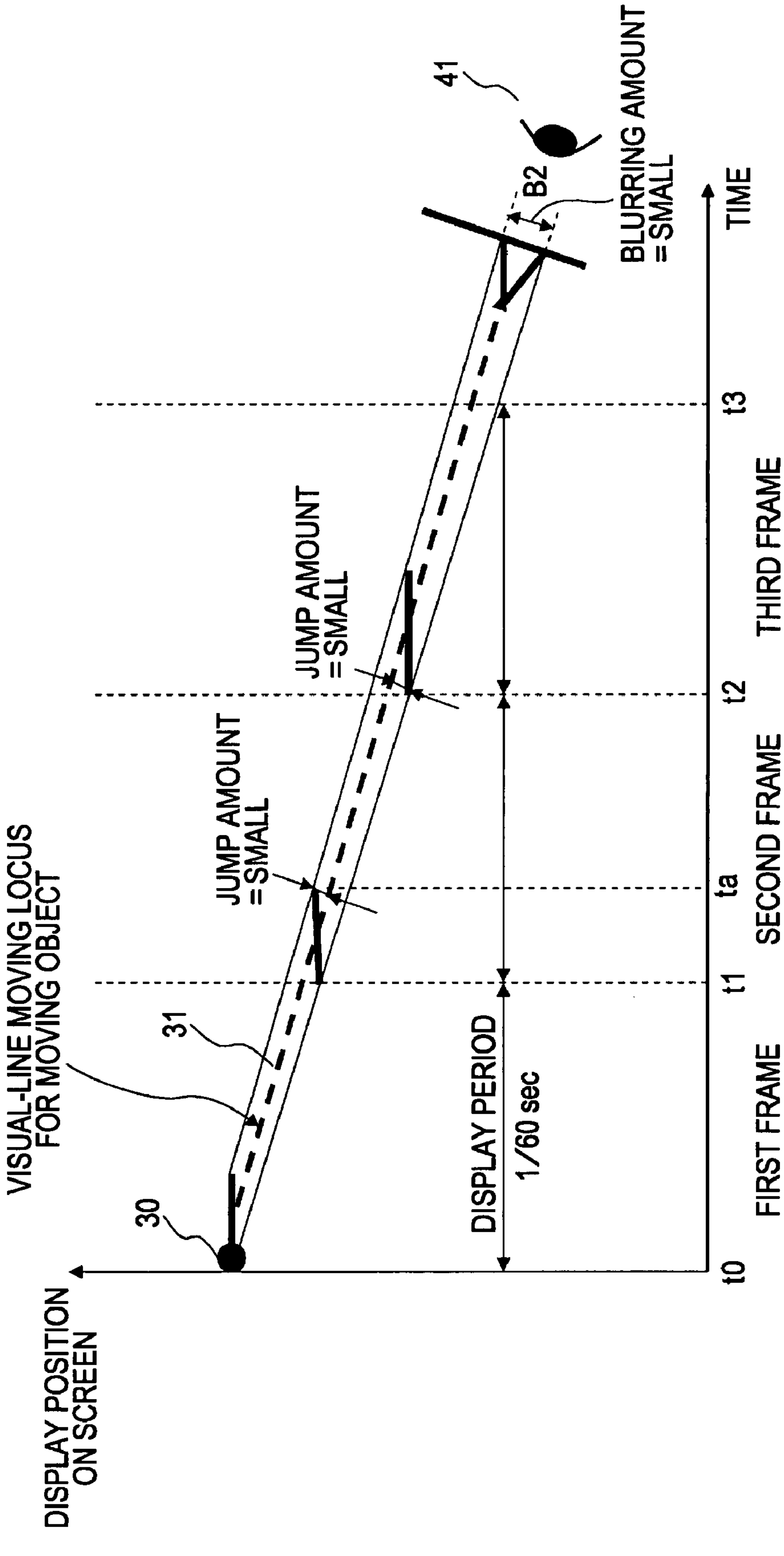
FIG. 2 illustrates a small occurrence of blurring in an impulse-driven display apparatus.

Impulse driving display processing performed in a display different from a frame-hold-type display, such as a CRT display, is described below with reference to FIG. 2. On a CRT display, image pixels are sequentially driven, and thus, the display period of each pixel is shorter than that in the frame-hold-type display.

In such impulse driving display, the period in which a moving object 30 is displayed on a display is short. As discussed with reference to FIG. 1, a user 41 follows the object 30 along a visual-line moving locus 31 shown in FIG. 2. In this case, the positions at which the moving object 30 is displayed on the screen do not considerably deviate from the visual-line moving locus 31. The farthest position at which the moving object 30 separates from the visual-line moving locus 31 is, for example, time ta shown in FIG. 2, even at this time, only a very small amount of jump occurs. A very small amount of jump also occurs at time t2. As a result, to the retina of the user 41, a large amount of blurring is not observed, and instead, only a small amount of blurring B is recognized. Thus, the occurrence of blurring, such as that in a frame-hold-type display device discussed with reference to FIG. 1, can be suppressed.

2. IP Conversion

As discussed above, when displaying an image to be subjected to interlace scanning on a frame-hold-type display device, such as a liquid crystal device, IP conversion is performed for converting such an interlace image into a progressive image by interpolating pixel values of the pixels of the interlace image in lines not being associated with image signals.

Figure 3:
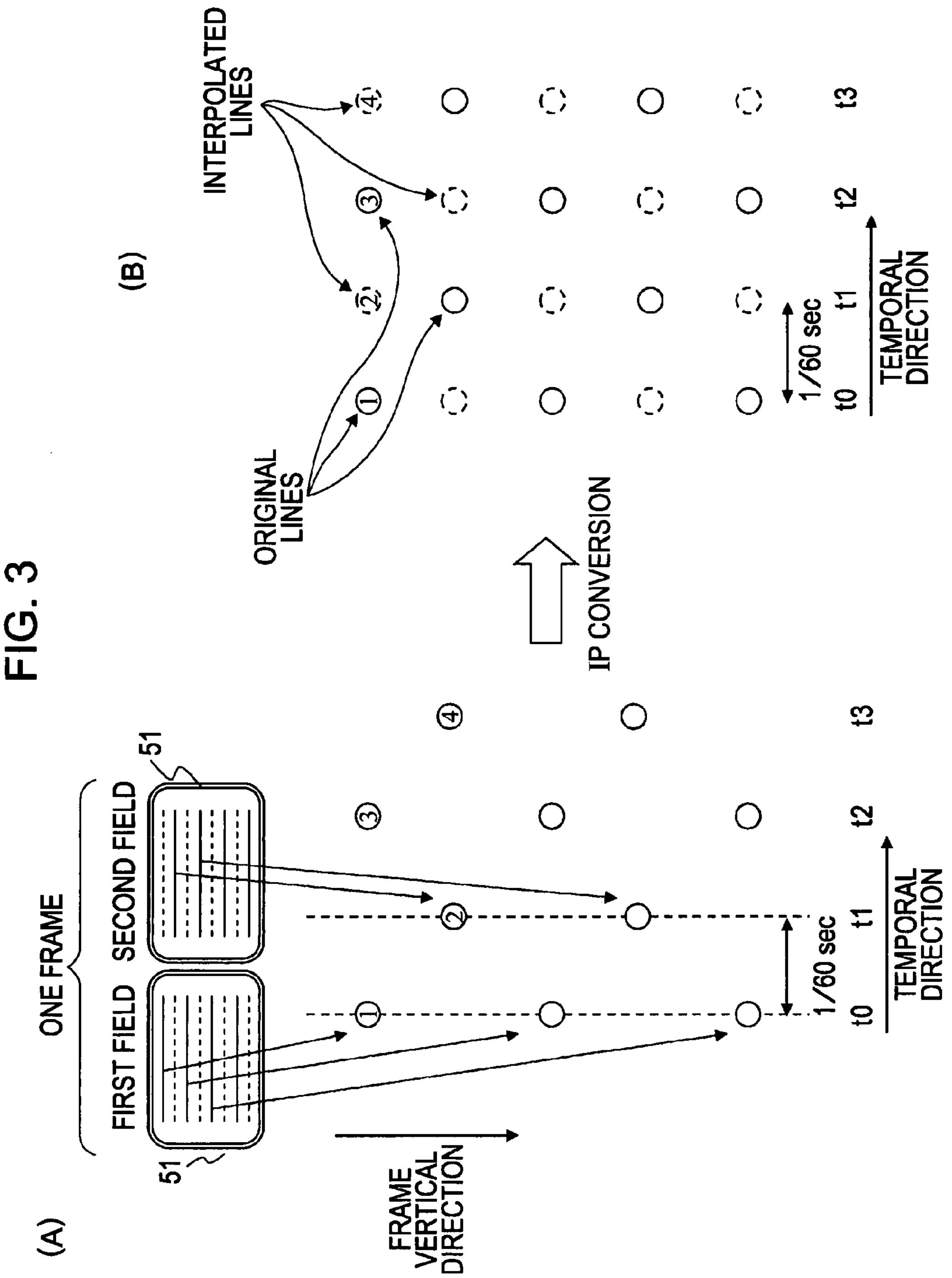
FIGS. 3 and 4 illustrate IP conversion processing.

FIG. 3 illustrates general IP conversion. An example of output pixel lines in the temporal direction t0 to t4 during interlace scanning before IP conversion is shown in (A) of FIG. 3. At time t0, for example, the pixel values are output every other line of a display unit 51. At the subsequent time t1, the pixel values in lines that are not output at time t0 are output.

The interlace signal output at time t0 corresponds to a first field signal, while the interlace signal output at time t1 corresponds to a second field signal. The first and second field signals form one frame.

When the interlace signals are displayed on the display unit 51 performing frame-hold-type display, as stated above, lines associated with display image signals and lines not being associated with the display image signals are alternately generated, which makes flicker noticeable and also reduces the luminance level. To solve this problem, IP conversion for converting interlace signals into progressive signals is performed.

The image after conducting IP conversion is shown in (B) of FIG. 3. Original lines 61 associated with display image signals and interpolated lines 62 not being associated with display image signals are alternately disposed in the vertical direction and also in the horizontal (temporal direction).

Figure 4:
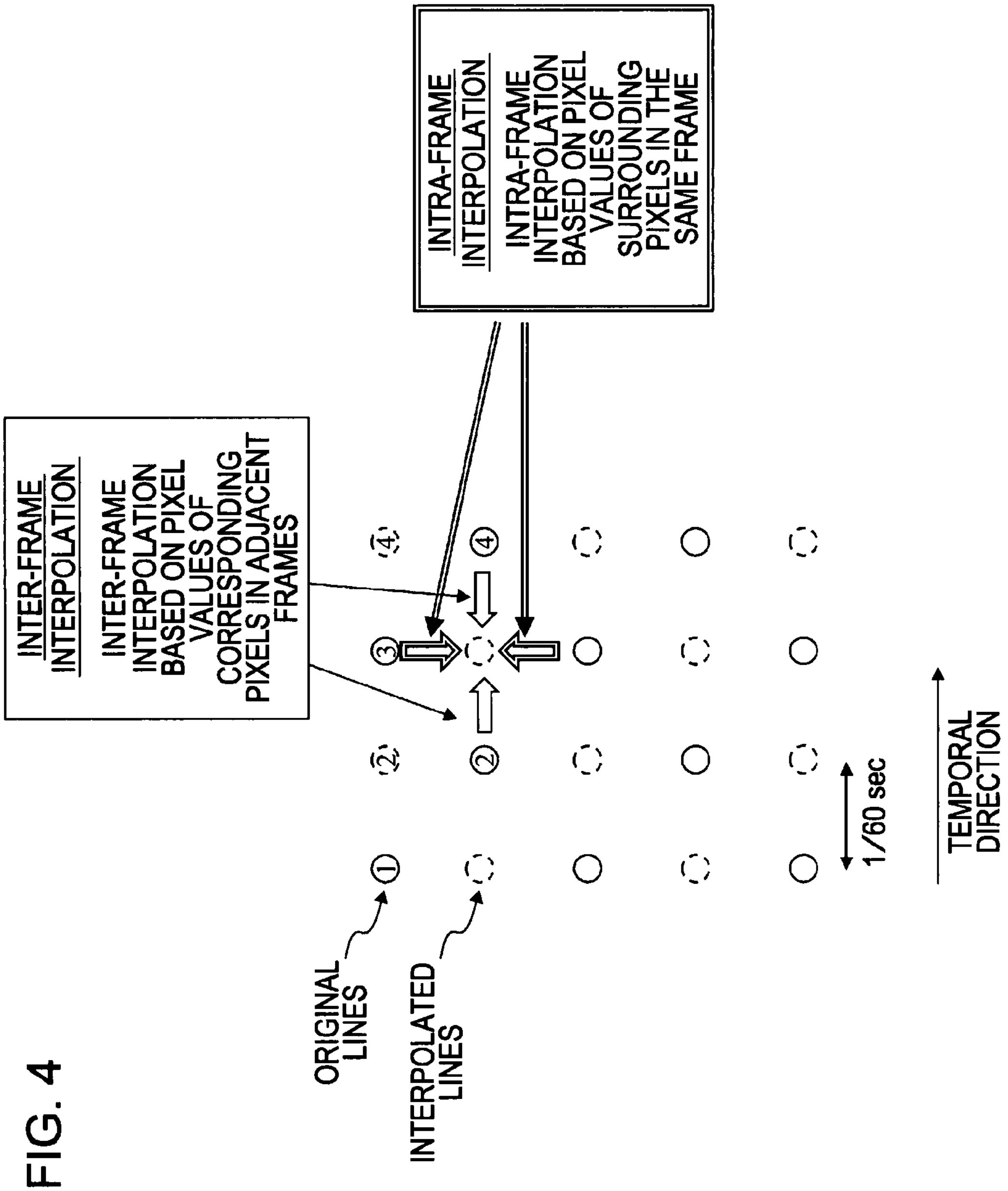

The IP conversion technique is described below with reference to FIG. 4. The IP conversion technique includes, as shown in FIG. 4, two interpolation modes, i.e., inter-frame interpolation in which interpolation is performed by using future and past lines in the temporal direction and intra-frame interpolation in which interpolation is performed by using upper and lower lines in the same frame. Generally, the switching and allocation of the inter-frame interpolation and the intra-frame interpolation are performed in real time according to the features of the image. More specifically, motion information is obtained, and then, the allocation ratio between the two interpolation modes is changed in accordance with the motion information so that the pixel values of pixels to be interpolated are determined.

In this manner, the pixel values of pixels to be interpolated are determined on the basis of the pixel values of pixels in the same frame (frame direction) or in different frames (temporal direction), for example, by calculating the average of the pixel values of surrounding pixels. In this interpolation processing, however, the determined pixel values of pixels to be interpolated may be different from those of an actual image depending on the type of interlace image, which is a factor for decreasing the image quality.

The pixel values of pixels to be generated by such interpolation processing are pixel values estimated on the basis of surrounding pixels in the frame direction or in the temporal direction, i.e., they are pseudo-pixels. Accordingly, a user has to view content partially replaced by pseudo-pixels, which is annoying for users who desire the faithful playback of original content.

In interpolation processing in IP conversion, in most of the cases, the pixel values similar to those of surrounding pixels in the spatial or temporal direction are set, which may further accelerate the above-described image blurring phenomenon.

3. Details of Configuration and Processing of Apparatus

Details of the configuration and processing of an image display apparatus according to an embodiment of the present invention are given below. In the image display apparatus, such as a frame-hold-type display utilizing, for example, liquid crystal or an organic EL, the occurrence of blurring phenomenon is suppressed without impairing the brightness or contrast level. Additionally, display control on pixels interpolated during IP conversion is performed through gain control performed on outputs of the interpolated pixels so that original content can be faithfully played back while allowing a progressive signal including information on the interpolated pixels to be displayed.

More specifically, in the configuration in which images are displayed on a frame-hold-type display, such as a liquid crystal display, by performing IP conversion for converting interlace signals into progressive signals, a frame is divided into sub-frames in a time-division manner. In this case, two types of frames, i.e., high-frequency-enhanced sub-frames in which high-frequency areas, such as edges or outline areas contained in the image, are enhanced, and high-frequency-suppressed sub-frames, are generated. Then, the high-frequency-enhanced sub-frames and the high-frequency-suppressed sub-frames are alternately displayed every 1/120 sec, so that the occurrence of blurring phenomenon is suppressed without impairing the brightness or contrast level. In this manner, display control on the pixels interpolated during IP conversion is performed through gain control performed on outputs of the interpolated pixels.

Generally, portions where image blurring appears noticeable to a viewer who observes an image displayed on a display are portions where the contrast changes sharply (edges) or outlines, i.e., an image area having a high spatial frequency. In contrast, in an image area having a low spatial frequency, i.e., a uniform image, such as a sky, displayed on a display, image blurring is less noticeable even if the image involves a motion. In an embodiment of the present invention, on the basis of such a visual characteristic, different processing operations are suitably performed on a high-frequency area, such as an edge or outline area, contained in an image, and a low-frequency area other than the high-frequency area, so that the occurrence of blurring phenomenon is suppressed without impairing the brightness or contrast level.

In image display processing executed in an embodiment of the present invention, an input image is divided into sub-frames in a time-division manner, and high-frequency-enhanced sub-frames in which a high-frequency image area, such as portions where contrast changes sharply (edges) or outlines, is enhanced, and high-frequency-suppressed sub-frames in which a high-frequency area is suppressed are alternately output. The blurring phenomenon is more noticeable in the high-frequency area of the image, and the brightness or contrast is associated with direct current (DC) components of the image.

In an embodiment of the present invention, a high-frequency-suppressed sub-frame is inserted between high-frequency-enhanced sub-frames, thereby effectively reducing the occurrence of blurring phenomenon. Additionally, the high-frequency-enhanced sub-frames compensate for the influence of the insertion of high-frequency-suppressed sub-frames on the image quality, thereby making it possible to display images without decreasing the brightness or contrast level.

Figure 5:
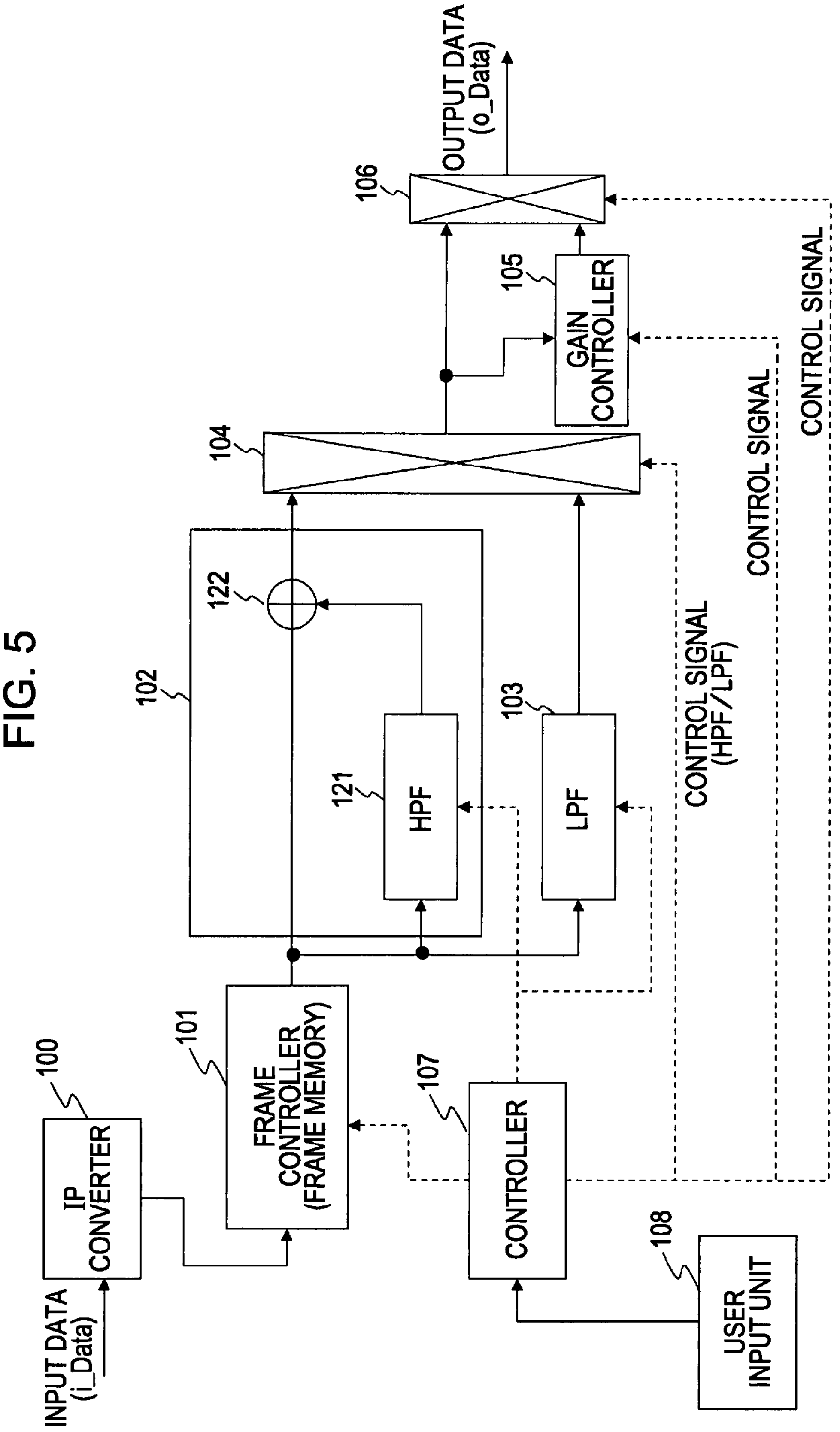
FIG. 5 is a block diagram illustrating a signal processing circuit in an image display apparatus according to an embodiment of the present invention.

Details of processing performed by the image display apparatus are discussed below with reference to FIG. 5. FIG. 5 is a block diagram illustrating a signal processing circuit in the image display apparatus according to an embodiment of the present invention. The signal processing circuit includes, as shown in FIG. 5, an IP converter 100, a frame controller 101, a high-frequency-enhanced sub-frame generator 102, a low-pass filter (LPF) 103, which serves as a high-frequency-suppressed sub-frame generator, a first selector 104, a gain controller 105, a second selector 106, a controller 107, and a user input unit 108. The high-frequency-enhanced sub-frame generator 102 includes a high-pass filter (HPF) 121 and an adder 122.

An input signal (i_DATA) is an interlace signal. The input signal (i_DATA) is input into the IP converter 100 in which the interlace signal is converted into a progressive signal. The IP conversion processing performed by the IP converter 100 is processing discussed with reference to FIGS. 3 and 4.

The interpolation processing includes, as discussed with reference to FIG. 4, inter-frame interpolation in which interpolation is performed by referring to future and past frames in the temporal direction and intra-frame interpolation in which interpolation is performed by referring to upper and lower lines in the same frame. The interpolation processing is executed by switching or allocating the two interpolation modes in real time according to the features of an image, such as motion vector information, so that the pixel values of pixels to be interpolated are determined. As a result, a progressive signal is generated.

The progressive signal generated in the IP converter 100 is input into the frame controller 101. The frame controller 101 increases the frame rate of the image data forming the progressive signal by xn so that one frame is divided into n sub-frames, and outputs the divided n sub-frames.

For example, if an image having a frame frequency of 60 Hz is input and n is 2, one frame is divided into two sub-frames in a time-division manner so that the image having a frame frequency of 60 Hz is converted into an image having a frame frequency of 120 Hz. More specifically, the frame controller 101 includes a frame memory, and the times at which the frame images are output from the frame memory are controlled by the controller 107 so that the frame images are output to the HPF 121 of the high-frequency-enhanced sub-frame generator 102 and the LPF 103, which serves as the high-frequency-suppressed sub-frame generator.

The HPF 121 and the LPF 103 alternately receive the time-divided sub-frames from the frame controller 101 and block low-frequency components and high-frequency components, respectively, from the input sub-frames, and outputs the resulting sub-frames.

The HPF 121 blocks low spatial-frequency components from an input sub-frame image to allow a high-frequency area, such as portions where the contrast changes sharply (edges) or outlines, to pass through the HPF 121. The output data of the HPF 121 is output to the adder 122. Then, it is added to the sub-frame image corresponding to the original image not subjected to filtering processing, and the resulting sub-frame image is output to the first selector 104. The output of the adder 122 serves as a high-frequency-enhanced sub-frame image in which the high-frequency area, such as edges or outlines, is enhanced.

The LPF 103 blocks high spatial-frequency components from the input sub-frame image to allow a low-frequency area to pass through the LPF 103. The output data of the LPF 103 is output to the first selector 104. The output data of the LPF 103 serves as a high-frequency-suppressed sub-frame image in which the high-frequency area, edges or outlines, is suppressed. The LPF processing is performed merely for suppressing high-frequency components without producing an influence on the DC components, which serve as low-frequency components, and thus, the brightness or contrast is not seriously decreased.

The first selector 104 serves as an output controller that alternately outputs high-frequency-enhanced sub-frames supplied from the adder 122 and high-frequency-suppressed sub-frames supplied from the LPF 103 at predetermined output times. The output timing of each sub-frame is controlled by a timing control signal output from the controller 107.

It is now assumed, for example, that an input image is an image having a frame frequency of 60 Hz and is divided into sub-frames having a frame frequency of 120 Hz in the frame controller 101 and that the sub-frames are subjected to filtering processing in the HPF 121 and in the LPF 103 and the resulting sub-frames are input into the first selector 104. In this case, the sub-frame images, i.e., the high-frequency-enhanced sub-frames supplied from the adder 122 and the high-frequency-suppressed sub-frames supplied from the LPF 103 are alternately output every 1/120 sec.

The high-frequency-enhanced sub-frames and the high-frequency-suppressed sub-frames are further output to the gain controller 105 and the second selector 106. The gain controller 105 performs gain control on each input frame, and more specifically, the gain controller 105 reduces the output level of input pixel value signals to ×1 or lower. That is, the gain controller 105 performs gain control to reduce the luminance level of the output signal. The purpose of the gain control is to reduce the output level of pixels interpolated during IP conversion.

The second selector 106 receives the high-frequency-enhanced sub-frames and the high-frequency-suppressed sub-frames from the first selector 104, and also receives the high-frequency-enhanced sub-frames and the high-frequency-suppressed sub-frames with a reduced output level from the gain controller 105, and selects each line of sub-frames on the basis of a control signal. That is, for the pixel lines interpolated during IP conversion, the second selector 106 receives data with a reduced level from the gain controller 105, and for the original pixel lines other than the interpolated pixel lines, the second selector 106 receives data that is not subjected to gain control in the gain controller 105 from the first selector 104.

The output result is displayed on the display unit of a frame-hold-type display device, such as an LCD. That is, the high-frequency-enhanced sub-frames and the high-frequency-suppressed sub-frames are alternately output every 1/120 sec, and for the pixel lines generated by interpolation processing during IP conversion, data with a reduced level is output and displayed.

The output level to be reduced in the gain controller 105 can be input through the user input unit 108. For example, the output level of the input pixel value signals can be set in a range from ×1 to ×0. If the output level is set to be ×0, interpolated pixels are output as black pixels, and as a result, an image reflecting the original image as an interlace image is displayed. On the other hand, if the output level is set to be ×1, the pixel values of the interpolated pixels are directly output, and as a result, a progressive image generated by IP conversion is displayed.

According to an embodiment of the present invention, the level of interpolated pixels can be controlled through gain control performed by the gain controller 105. As a result, the image can be adjusted and displayed as the user desires. Additionally, a high-frequency-suppressed sub-frame in which a high-frequency image area where image blurring is noticeable, such as portions where the contrast sharply changes (edges) and outlines, is suppressed is displayed between high-frequency-enhanced sub-frames. As a result, the occurrence of blurring phenomenon can be reduced. Also, the high-frequency-enhanced sub-frames can compensate for the influence of the insertion of high-frequency-suppressed sub-frames on the image quality, e.g., a decreased level of contrast. Thus, images can be displayed without impairing the brightness or contrast level.

Figure 6:
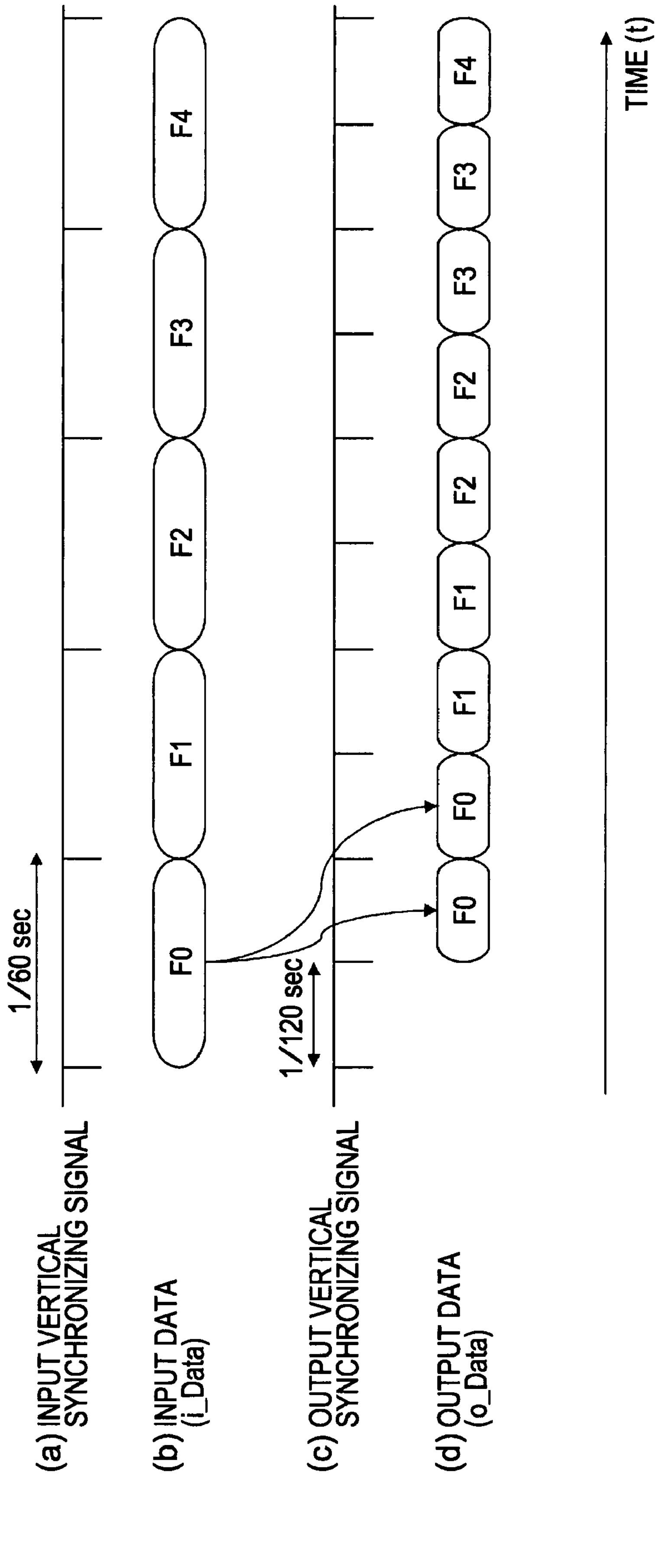
FIG. 6 illustrates the generation and output processing for sub-frames, which are a basis for an output signal in an image display apparatus according to an embodiment of the present invention.

The signal processing executed by the image display apparatus according to an embodiment of the present invention is described below. FIG. 6 illustrates the generation and output of sub-frames, which are a basis for output signals in the image display apparatus. FIG. 6 illustrates a temporal transition of (a) an input vertical synchronizing signal, (b) input data (i_DATA), (c) an output vertical synchronizing signal, and (d) output data (out_DATA). The time (t) elapses from the left to the right on the time axis shown in FIG. 6.

In the example shown in FIG. 6, the input vertical synchronizing signal indicated in (a) is a synchronizing signal at 60 Hz, and in the input data (i_DATA) indicated in (b), frames F0, F1, F2, . . . correspond to frame image data at 60 Hz, and each frame corresponds to a frame image forming a progressive image generated by the IP converter 100 shown in FIG. 5. As discussed with reference to FIG. 5, in the image display apparatus of an embodiment of the present invention, a 60-Hz image is output as a 120-Hz image. That is, two sub-frames are generated from one frame image.

As shown in FIG. 6, the output vertical synchronizing signal indicated in (c) is a synchronizing signal at 120 Hz, and sub-frames F0, F0, F1, F1, F2, . . . are sequentially output in accordance with this synchronizing signal. In the image display apparatus according to an embodiment of the present invention, on the basis of this signal processing, sub-frames F0, F0, F1, F1, F2, . . . are alternately output as high-frequency-enhanced sub-frames and high-frequency-suppressed sub-frames.

Figure 7:
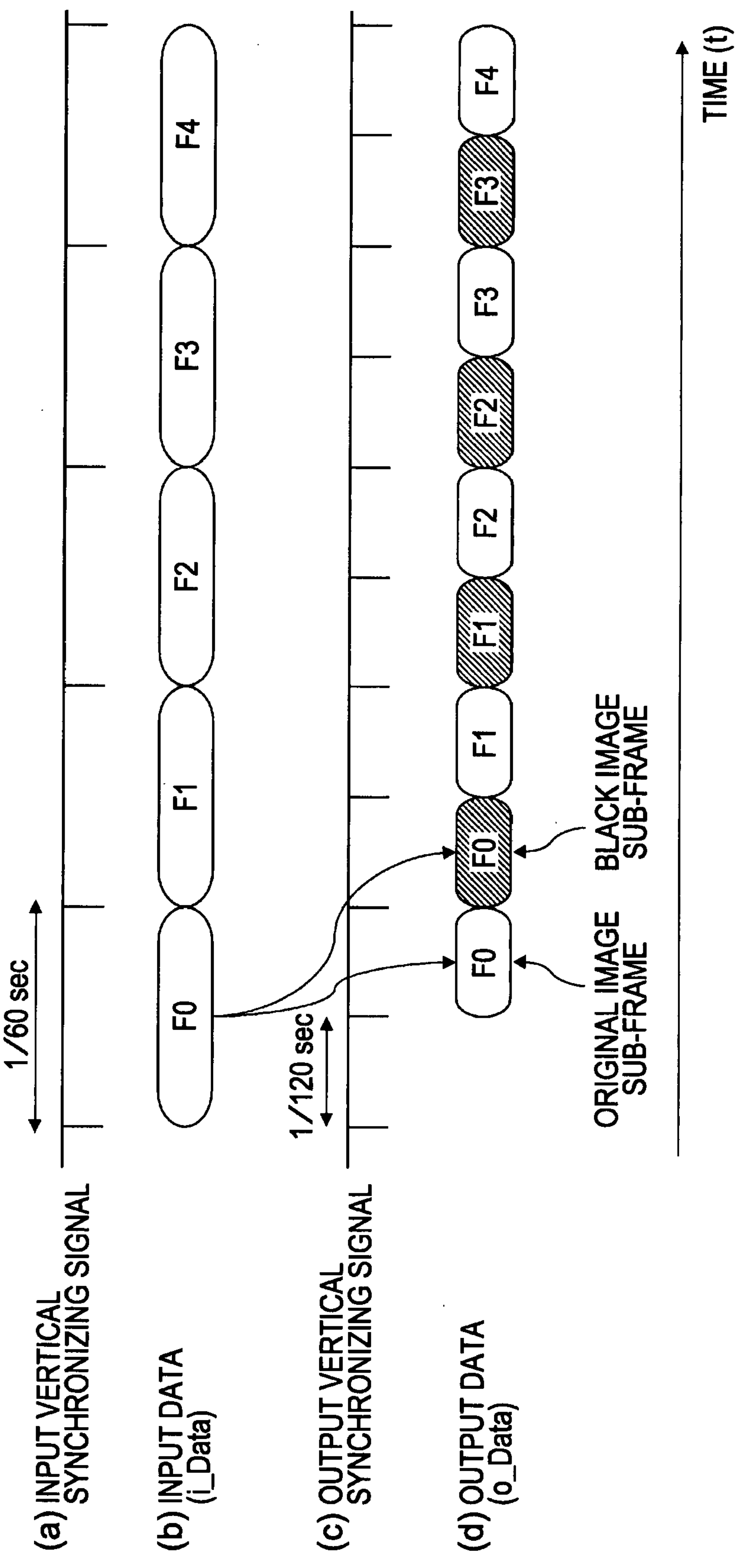
FIG. 7 illustrates the configurations of input and output signals corresponding to black insertion processing.

The configurations of an input signal and an output signal corresponding to the black insertion processing discussed in the Description of the Related Art are discussed below with reference to FIG. 7. As in FIG. 6, FIG. 7 illustrates a temporal transition of (a) an input vertical synchronizing signal, (b) input data (i_DATA), (c) an output vertical synchronizing signal, and (d) output data (out_DATA). The time (t) elapses from the left to the right on the time axis shown in FIG. 7.

In the example shown in FIG. 7, sub-frames forming a 120-Hz output image are formed as a combination of original image sub-frames which are the sub-frames of the original image and black image sub-frames including black pixels, and the original image sub-frames and the black image sub-frames are alternately output. This black insertion processing makes it possible to reduce the occurrence of blurring phenomenon. By this black insertion processing, the frame-hold-type display shown in FIG. 1 can be operated as pseudo-impulse driving display shown in FIG. 2. According to this processing, however, the overall screen becomes dark, and to the viewer, the resulting image appears with a decreased level of contrast.

Figure 8:
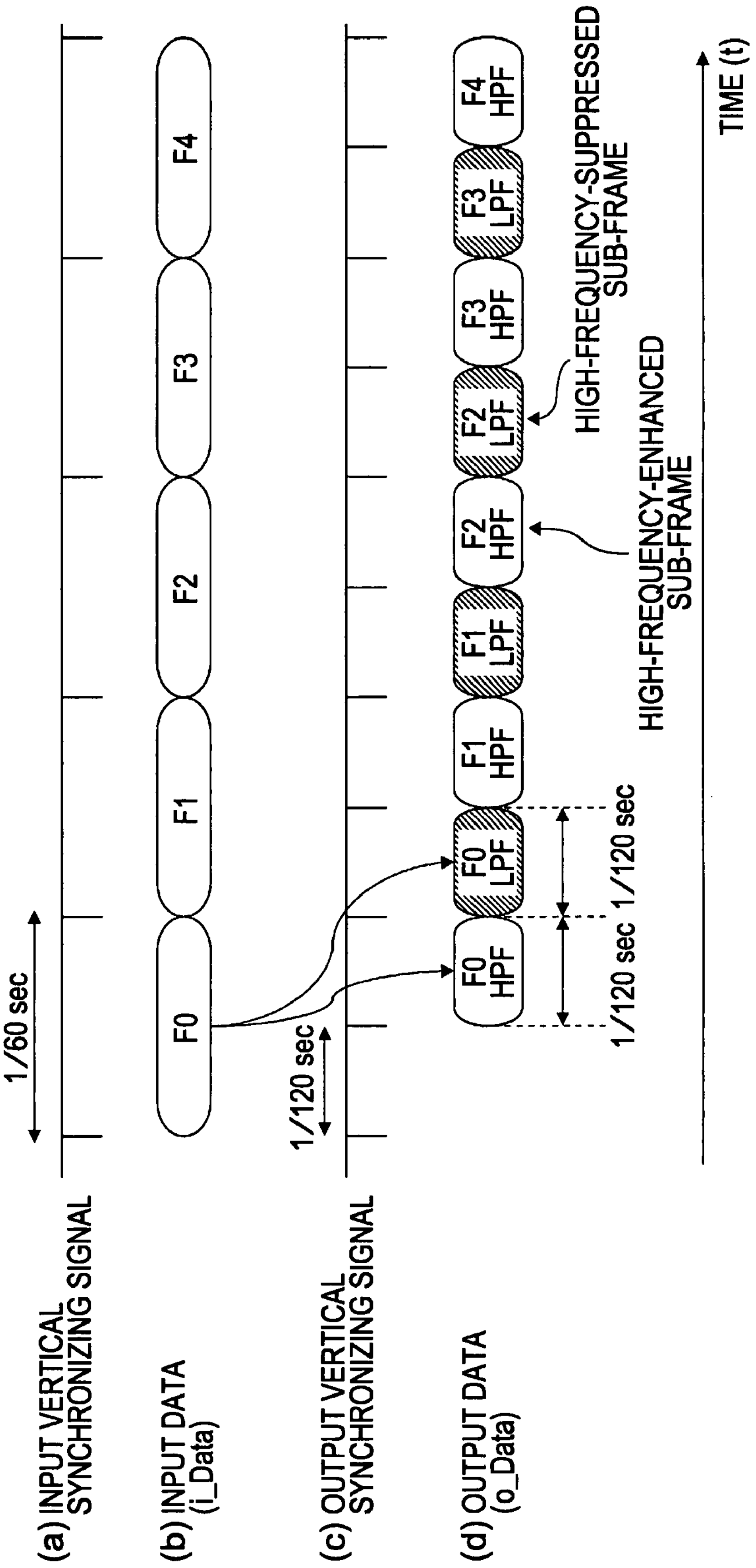
FIG. 8 illustrates input/output signals in accordance with signal processing according to an embodiment of the present invention.

FIG. 8 illustrates input/output signals based on the signal processing performed by the image display apparatus of an embodiment of the present invention. As in FIGS. 6 and 7, FIG. 8 illustrates a temporal transition of (a) an input vertical synchronizing signal, (b) input data (i_DATA), (c) an output vertical synchronizing signal, and (d) output data (out_DATA). The time (t) elapses from the left to the right on the time axis shown in FIG. 8.

As in FIG. 6 or 7, in the example shown in FIG. 8, the input image is a 60-Hz image, and the output image is a 120-Hz sub-frame image. That is, an image frame is divided into two (n=2) sub-frames by the frame controller 101 to generate 120-Hz sub-frames.

The output vertical synchronizing signal indicated in (c) of FIG. 8 is a synchronizing signal at 120 Hz, and in accordance with this synchronizing signal, sub-frames F0, F0, F1, F1, F2, . . . are sequentially output such that high-frequency-enhanced sub-frames and high-frequency-suppressed sub-frames are alternately output, as shown in FIG. 8. The output of those sub-frames corresponds to the output from the first selector 104 shown in FIG. 5.

That is, the high-frequency-enhanced sub-frames are generated by adding in the adder 122 the data subjected to high-pass filtering processing by the HPF 121 shown in FIG. 5 to the data not subjected to filtering processing. The high-frequency-suppressed sub-frames are generated by blocking high spatial frequency components through low-pass filtering processing in the LPF 103 shown in FIG. 5.

The high-frequency-enhanced sub-frames and the high-frequency-suppressed sub-frames are further output to the gain controller 105 and the second selector 106. Then, a frame signal with a reduced level of luminance by being subjected to gain control in the gain controller 105 and a frame signal without being subjected to gain control are input into the second selector 106. The second selector 106 selects each line of sub-frames on the basis of a control signal. That is, for the lines interpolated during IP conversion, the second selector 106 outputs data with a reduced level supplied from the gain controller 105, and for the original pixel lines, the second selector 106 receives the data from the first selector 104 and outputs the data without being subjected to gain control.

The output result is displayed on the display unit of a frame-hold-type display device, such as an LCD. That is, the high-frequency-enhanced sub-frames and the high-frequency-suppressed sub-frames are alternately output every 1/120 sec.

As discussed above, a high-frequency-suppressed sub-frame in which a high-frequency image area where image blurring is noticeable, such as portions where the contrast sharply changes (edges) and outlines, is suppressed is displayed between high-frequency-enhanced sub-frames. As a result, the occurrence of blurring phenomenon can be reduced. Also, the high-frequency-enhanced sub-frames can compensate for the influence of the insertion of high-frequency-suppressed sub-frames on the image quality. As a result, images can be displayed without reducing the brightness or contrast level.

It is now assumed, for example, that a 60-Hz source image is displayed on an FPD in which a display operation is updated from 60 Hz to 120 Hz. Instead of simply displaying one frame twice, high-frequency-enhanced sub-frames and high-frequency-suppressed sub-frames are alternately displayed every 1/120 sec. This produces almost the same effect on high-frequency components, which are feature points of the image, as that obtained by inserting a black color frame into every other frame. As a result, the high-frequency components can be displayed by pseudo-impulse driving in the cycle of 1/60 sec, while the low-frequency components are data not being subjected to any processing. Accordingly, the occurrence of blurring phenomenon can be reduced without sacrificing the brightness or contrast level.

Additionally, for pixel lines interpolated during IP conversion, data with a reduced level in the gain controller 105 is output. As stated above, the output level to be reduced in the gain controller 105 can be set through the user input unit 108. If the output level is set to be ×0, interpolated pixels are output as black pixels, and as a result, an image reflecting the original image as an interlace image is displayed. On the other hand, if the output level is set to be ×1, the pixel values of the interpolated pixels are output as they are, and as a result, a progressive image generated by IP conversion is displayed.

The filtering characteristics of the HPF 121 and the LPF 103 discussed with reference to FIG. 5 are preferably set in the following manner. When the user observes an output image in which the high-frequency-enhanced sub-frames and high-frequency-suppressed sub-frames are alternately displayed, the integrated image picked up by the user's retina appears almost the same level as the original image. The filtering characteristics are set such that, for example, as shown in FIG. 9, a proportion of frequency components allowed to pass through the HPF 121 or the LPF 103 is equal to a proportion of frequency components blocked by the LPF 103 or the HPF 121.

Figure 9:
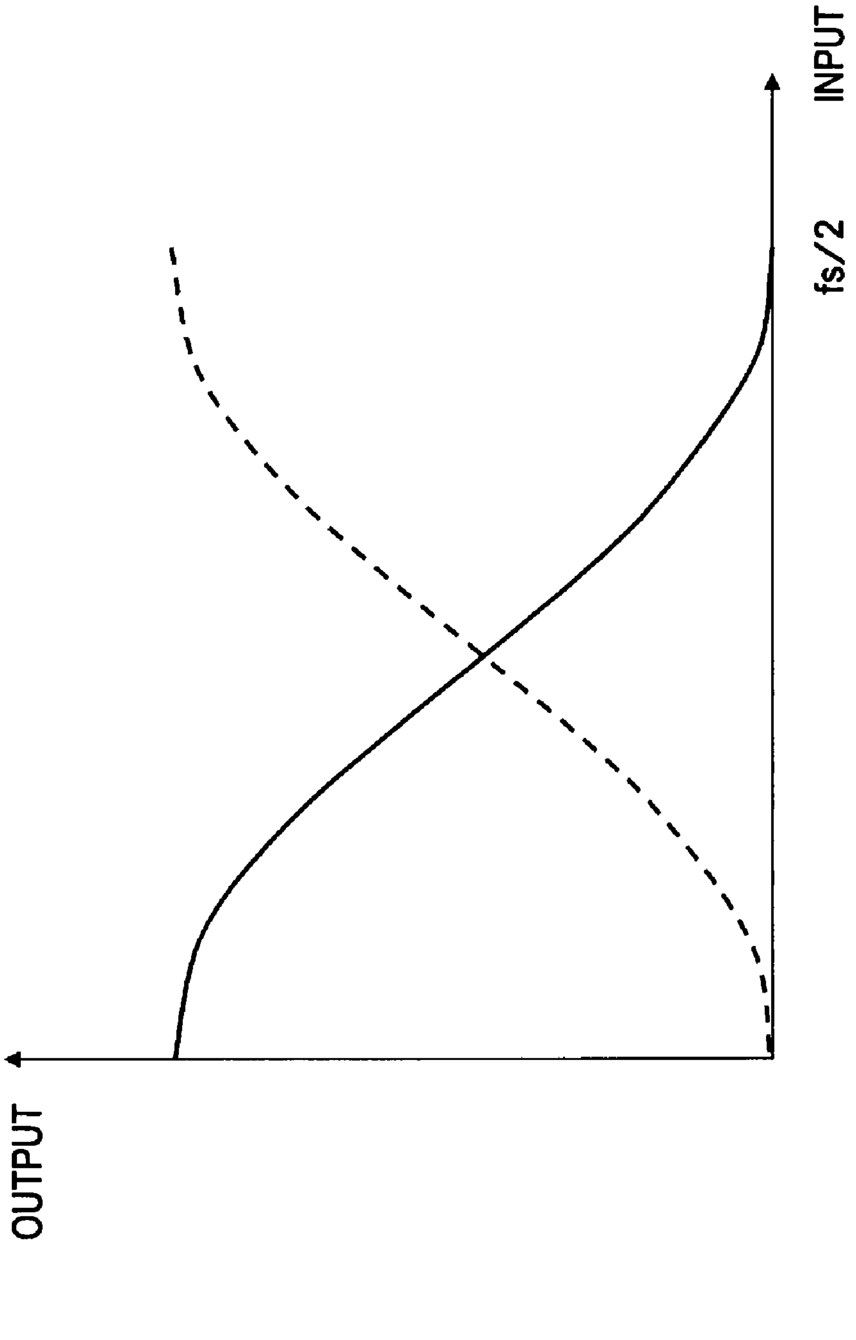
FIG. 9 illustrates an example of the relationship of an output frequency characteristic to an input frequency of a high-pass filter (HPF) and a low-pass filter (LPF)

The graph shown in FIG. 9 illustrates the relationship of the output frequency (vertical axis) characteristic to the input frequency (horizontal axis) characteristic of the HPF 121 and the LPF 103 discussed with reference to FIG. 5. The HPF 121 blocks low-frequency components and allows high-frequency components to pass therethrough, while the LPF 103 blocks high-frequency components and allows low-frequency components to pass therethrough. The amounts by which the HPF 121 and the LPF 103 block low-frequency components and high-frequency components, respectively, are set, as shown in FIG. 9, to be equal to the amounts by which the LPF 103 and the HPF 121 allow low-frequency components and high-frequency components, respectively, to pass therethrough. The integrated value of the alternately output sub-frame images becomes equal to the original image, and to the user, the output image including the sub-frames can be recognized as an image similar to the original image. In this manner, it is preferable that the HPF 121 and the LPF 103 shown in FIG. 5 exhibit filtering characteristics complementary to each other.

Figure 10:
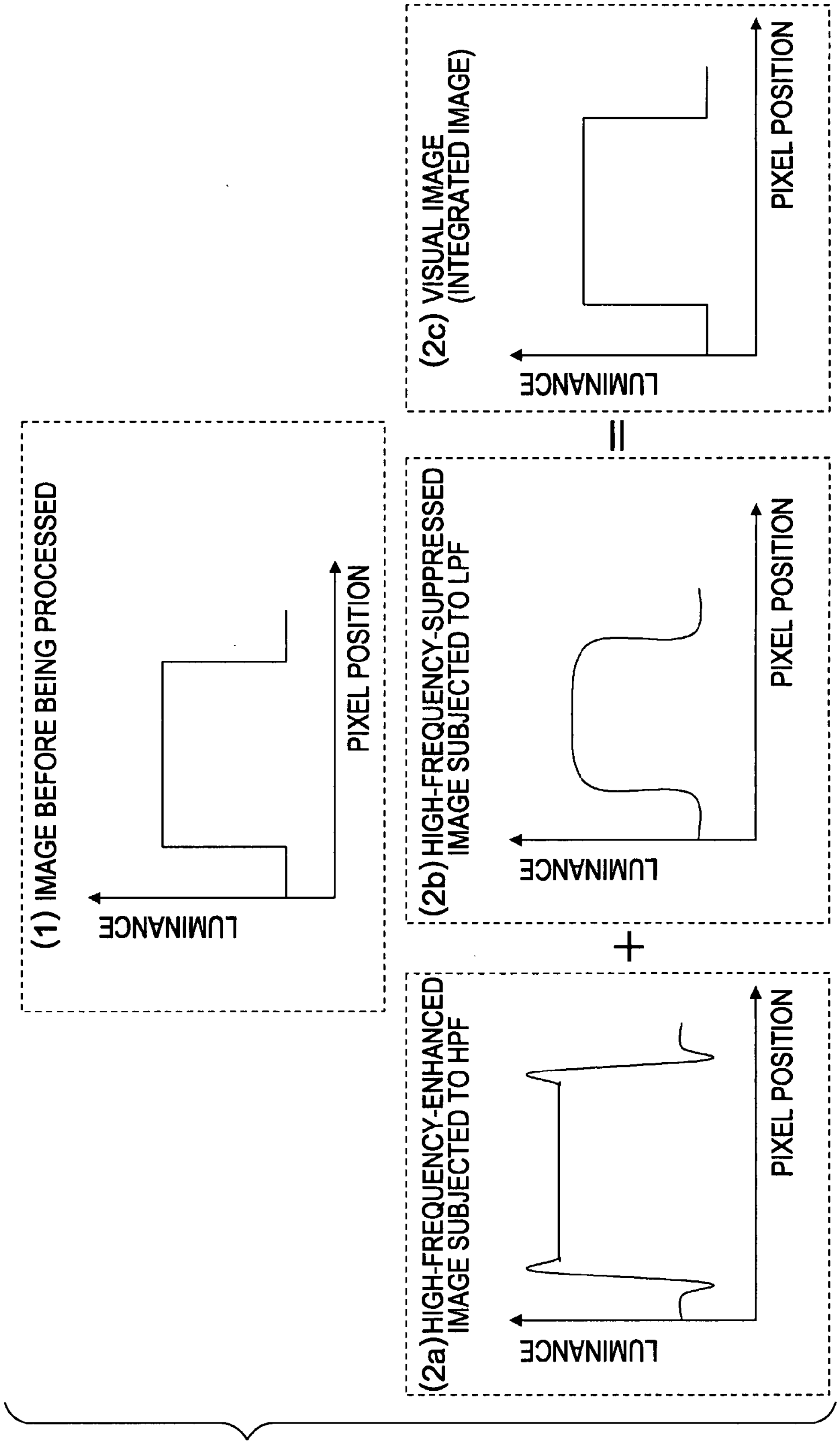
FIG. 10 illustrates an example of filtering processing having the filtering output characteristic shown in FIG. 9.

FIG. 10 illustrates an example of filtering processing exhibiting the filtering output characteristic shown in FIG. 9. The pixel position and the luminance distribution of the image before being subjected to filtering processing are shown in (1) of FIG. 10. A high-frequency-enhanced image subjected to high-pass filtering is shown in (2*a*) of FIG. 10 in which an output with enhanced edge portions, i.e., high-frequency-enhanced sub-frames, is generated and output. A high-frequency-suppressed image subjected to low-pass filtering is shown in (2*b*) of FIG. 10 in which an output with smoothened edge portions, i.e., high-frequency-suppressed sub-frames, is generated and output. The user observes those high-frequency-enhanced image and high-frequency-suppressed image alternately, so that the integrated image of the two sub-frame images can be observed to the user's retina. The integrated image picked up by the user's retina is the image shown in (2*c*) of FIG. 10, i.e., the image (2*a*)+(2*b*). If the image (2*c*)=(2*a*)+(2*b*) is equivalent to the original image shown in (1) of FIG. 10, to the user, the output image including the sub-frames can be recognized as an image similar to the original image. The filtering characteristics of the HPF 121 and the LPF 103 shown in FIG. 5 are set to be complementary to each other, and then, the image shown in (2*c*) of FIG. 10 becomes equivalent to the original image shown in (1) of FIG. 10 before being subjected to the filtering processing. As a result, to the user, the output image including the sub-frames can be recognized as an image similar to the original image.

Figure 11:
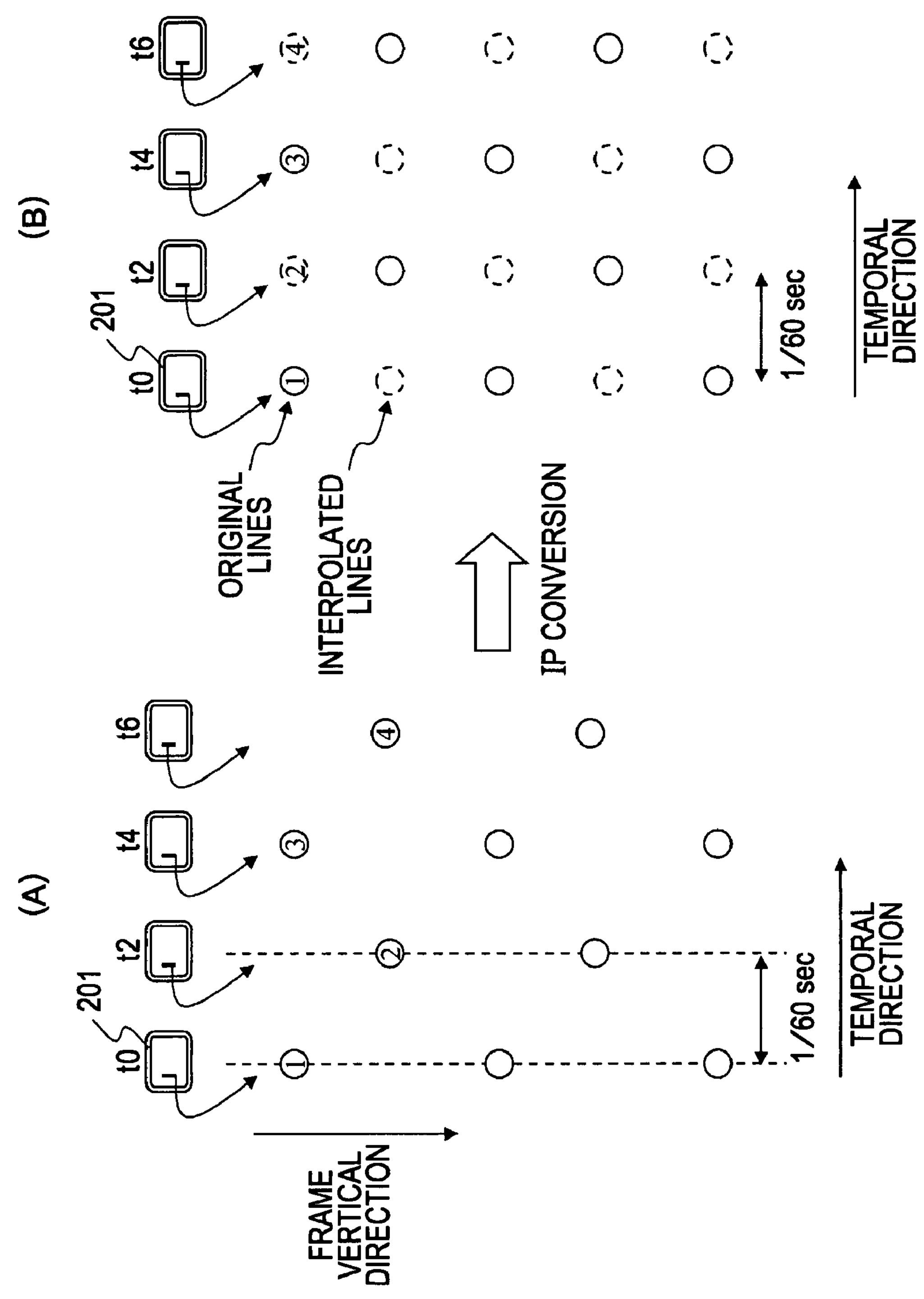
FIGS. 11 through 13 illustrate a data transition when processing according to an embodiment of the present invention is applied.
Figure 12:
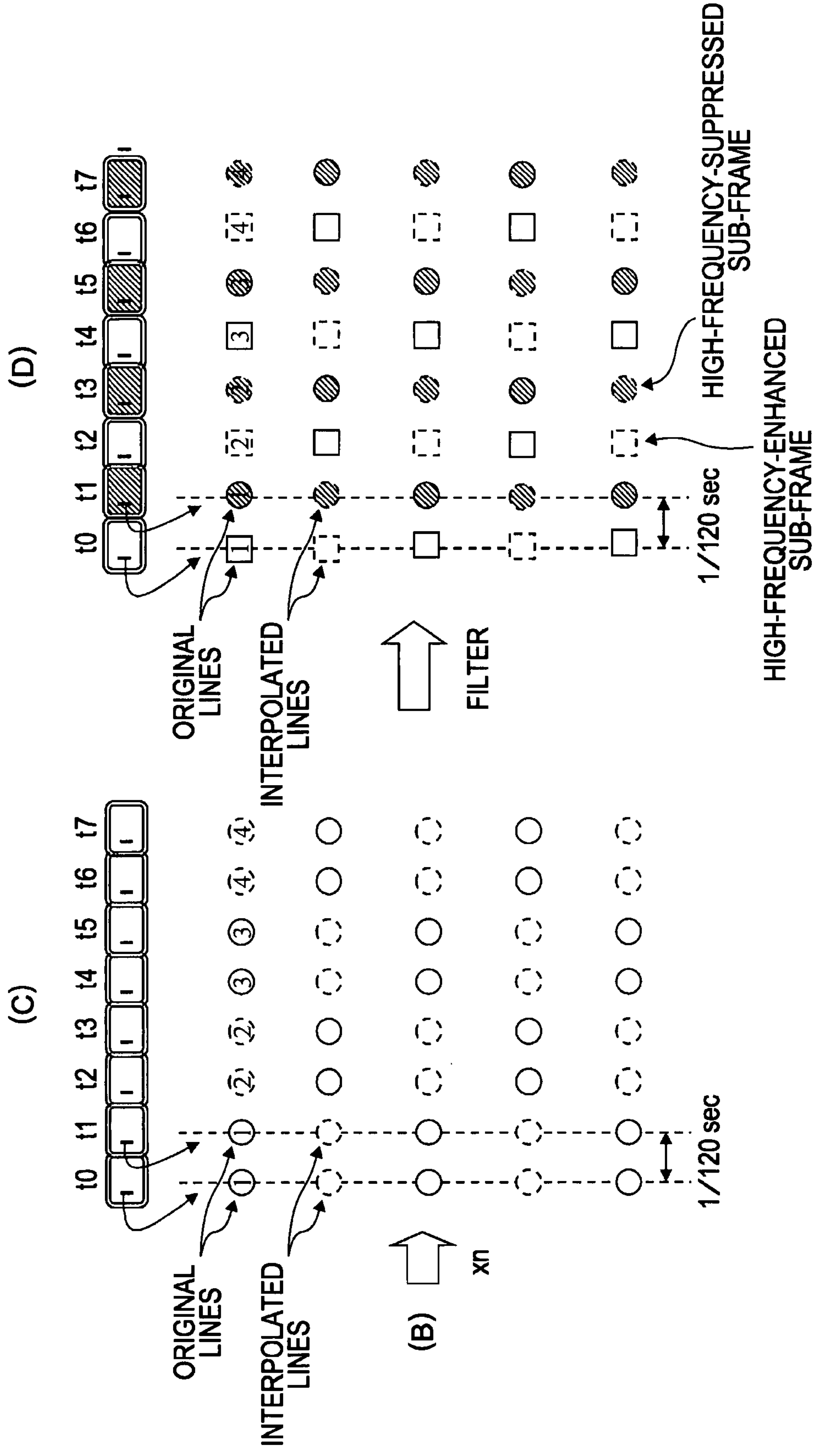

A description is now given, with reference to FIGS. 11 and 12, of data displayed as display pixels on a display device, such as an LCD. The processing performed by the IP converter 100 of the image display apparatus shown in FIG. 5, i.e., the IP conversion processing, is shown in (A) and (B) of FIG. 11. Display pixels in the vertical lines when an input interlace signal is displayed on a display unit 201 are shown in (A) of FIG. 11 as data t0, t2, t4, and t6 in chronological order. Since the input image is a 60-Hz image, the interval between t0, t2, t4, and t6 is 1/60 sec.

As discussed with reference to FIGS. 3 and 4, in accordance with the features of the image, such as motion vector information, the IP converter 100 adjusts the switching and allocation of inter-frame interpolation in which interpolation is conducted by using future and past frame lines in the temporal direction and intra-frame interpolation in which interpolation is conducted by using upper and lower lines in the same frame to determine the pixel values of pixels to be interpolated, thereby generating a progressive signal. The original lines associated with the original display image signal and the interpolated lines not being associated with the display image signal are alternately disposed, as indicated in (B) of FIG. 11, in the vertical direction in the same frame and also in the time axis direction.

In the frame controller 101 shown in FIG. 5, the frame rate of the progressive image generated by interpolation processing is increased by ×n so that n sub-frames are generated from one original frame. If n=2, two sub-frames are generated from one original frame so that a 120-Hz image signal is generated.

The 120-Hz image signal displayed on the display is shown in (C) of FIG. 12. This display example corresponds to a display example in which data subjected to the signal processing discussed with reference to FIG. 6 is directly displayed. The interval between the time t0 to t1, t1 to t2, . . . is 1/120 sec, and sub-frames are displayed at 120 Hz.

In the image display apparatus according to an embodiment of the present invention, high-frequency-enhanced sub-frames and high-frequency-suppressed sub-frames are alternately output. More specifically, the high-frequency-enhanced sub-frames are sub-frames generated in the adder 122 by adding data subjected to high-pass filtering processing in the HPF 121 shown in FIG. 5 to data before being subjected to filtering processing. The high-frequency-suppressed sub-frames are sub-frames generated by blocking high spatial frequency components by performing low-pass filtering processing with the LPF 103 shown in FIG. 5.

The output of the processing result is shown in (D) of FIG. 12. In (D) of FIG. 12, the interval between the time t0 to t1, t1 to t2, . . . , is 1/120 sec in which the high-frequency-enhanced sub-frames and the high-frequency-suppressed sub-frames are alternately output at 120 Hz. By the output of sub-frames, the occurrence of blurring phenomenon is reduced without decreasing the brightness or contrast level.

The level of pixel lines interpolated in the IP conversion is reduced in the gain controller 105, and then, the second selector 106 selects and outputs each line of the data. That is, for the original lines other than the pixels interpolated are output, data without being subjected to gain control is output, while for the pixel lines generated by interpolation processing, a signal with a level reduced in the gain controller 105 is output.

Figure 13:
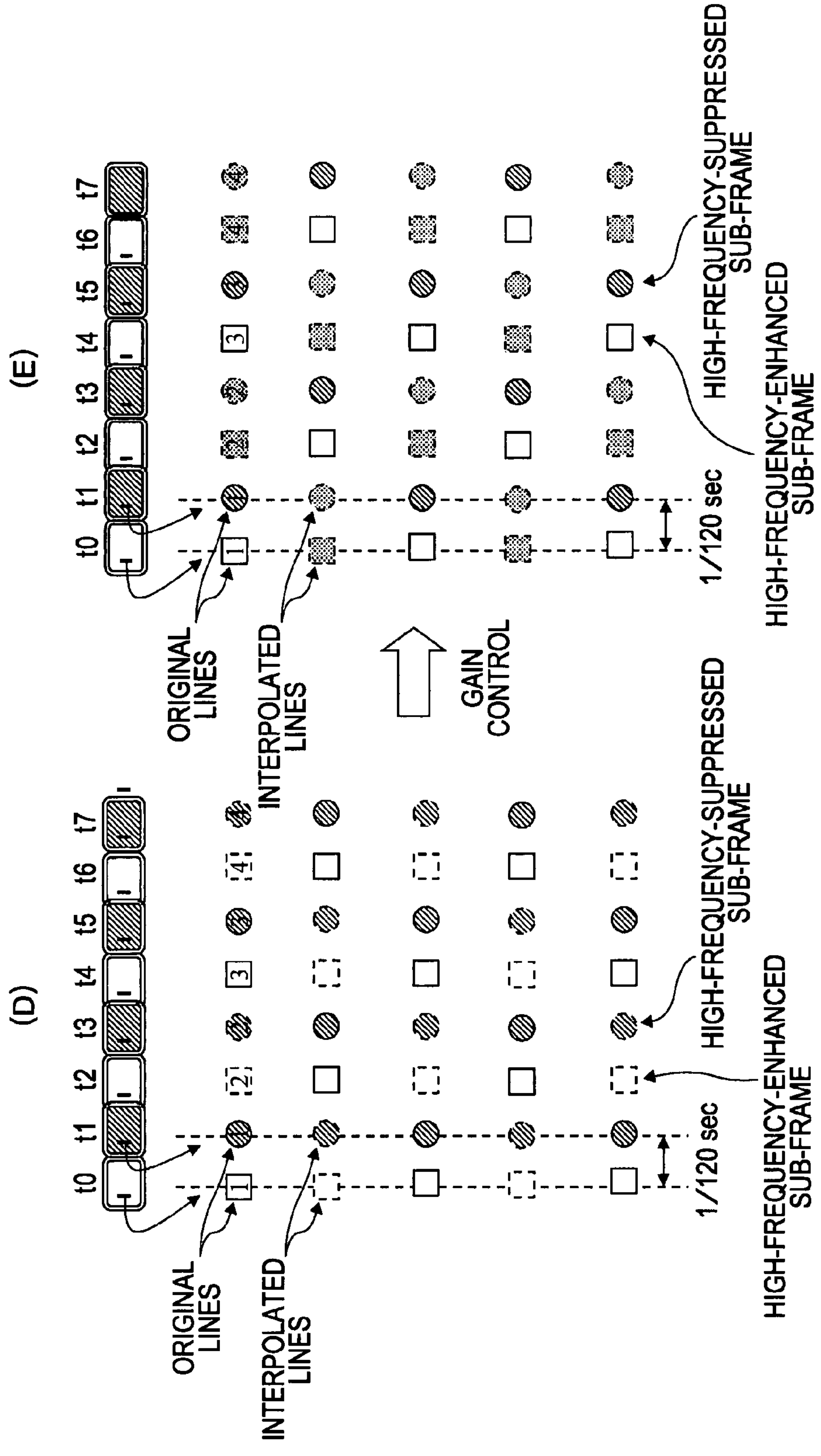

The output of the processing result is shown in (E) of FIG. 13. The output shown in (D) of FIG. 13 is the same as shown in (D) of FIG. 12 in which the high-frequency-enhanced sub-frames and the high-frequency-suppressed sub-frames are alternately output. This output is input into the gain controller 105 and the second selector 106, and the signal ultimately output to the display unit is the signal configuration shown in (E) of FIG. 13.

In the signal configuration shown in (E) of FIG. 13, the interval between the time to t1, t1 to t2, . . . , is 1/120 sec in which the high-frequency-enhanced sub-frames and the high-frequency-suppressed sub-frames are alternately output at 120 Hz. The interpolated lines contained in the sub-frames are associated with signals with a reduced level.

The output level to be reduced in the gain controller 105 can be input through the user input unit 108. If the output level is set to be ×0, interpolated pixels are output as black pixels, and as a result, an image reflecting the original image as an interlace image is displayed. On the other hand, if the output level is set to be ×1, the pixel values of the interpolated pixels are output as they are, and as a result, a progressive image generated by IP conversion is displayed.

Figure 14:
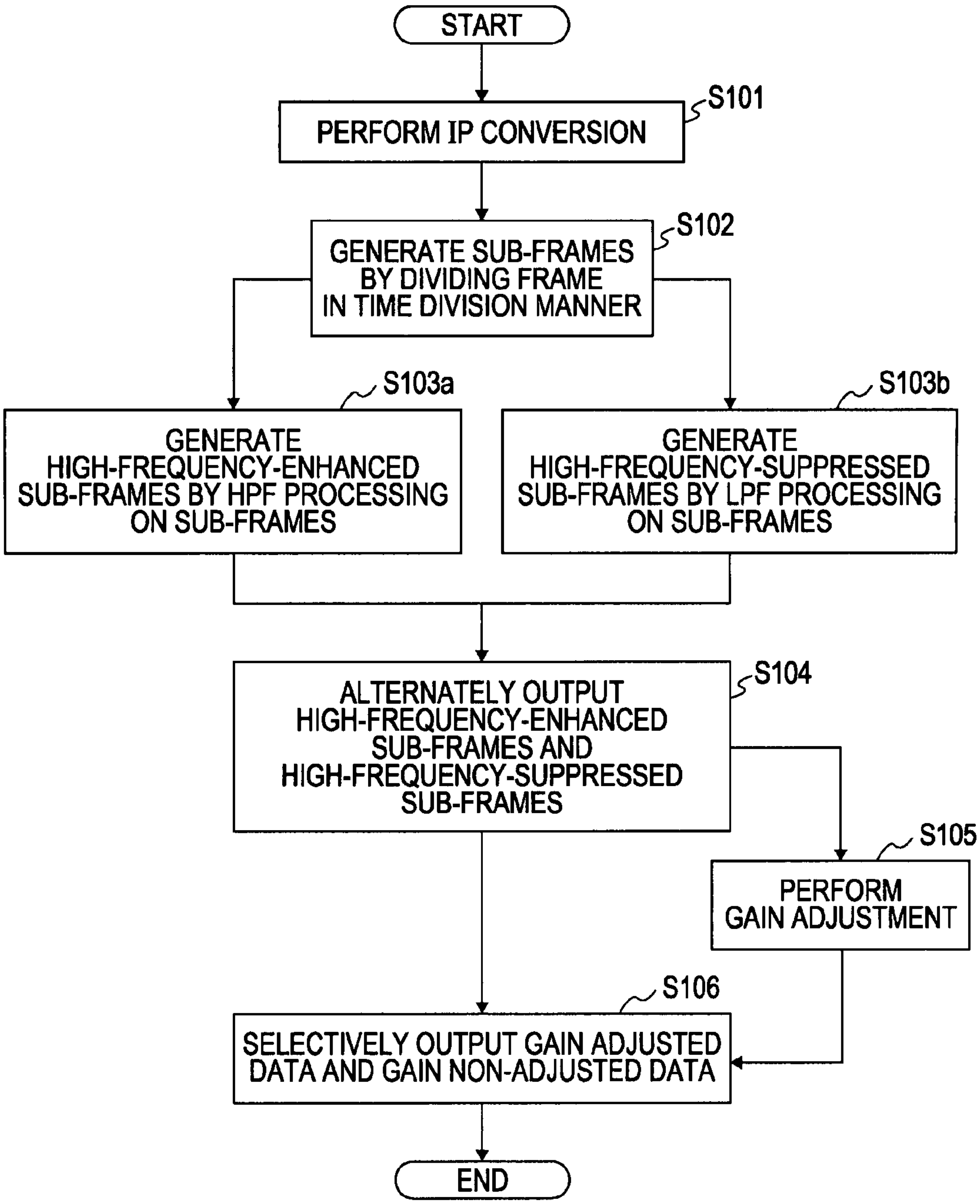
FIG. 14 is a flowchart illustrating a processing sequence executed by an image display apparatus according to an embodiment of the present invention.

A processing sequence executed by the image display apparatus shown in FIG. 5 is described below with reference to the flowchart in FIG. 14. The overall processing is controlled by the controller 107 shown in FIG. 5. For example, the controller 107 includes a central processing unit (CPU) and performs processing control according to a computer program recorded on a memory.

In step S101, the IP converter 100 shown in FIG. 5 executes IP conversion processing for converting an interlace signal into a progressive signal.

Then, in step S102, the frame controller 101 shown in FIG. 5 increases the frame rate of the progressive signal (e.g., a 60-Hz image signal) to generate n sub-frames from one original frame.

In steps S103*a* and S103*b*, high-frequency-enhanced sub-frames and high-frequency-suppressed sub-frames are generated. More specifically, in step S103*a*, the HPF 121 performs high-pass filtering to generate an HPF filtering output, and then, the adder 122 adds the HPF filtering output to the data not subjected to HFP filtering to generate high-frequency-enhanced sub-frames. In step S103*b*, the LPF 103 performs low-pass filtering to generate high-frequency-suppressed sub-frames in which high spatial frequency components are blocked.

Then, in step S104, the first selector 104 shown in FIG. 5 alternately outputs the high-frequency-enhanced sub-frames and high-frequency-suppressed sub-frames.

Then, in step S105, the gain controller 105 shown in FIG. 5 performs gain control on the high-frequency-enhanced sub-frames and high-frequency-suppressed sub-frames that are output in step S104. As a result of this processing, the level of the output frames is reduced in a range from ×0 to ×1, which is selected through the user input unit 108.

In step S106, the second selector 106 shown in FIG. 5 selectively outputs the gain adjusted data and the gain non-adjusted data. That is, for the original lines other than the interpolated pixels, data without being subjected to gain control is output, and for the interpolated pixel lines, a signal with a level reduced in the gain controller 105 is output.

The data displayed as a result of step S106 is the image data shown in (E) of FIG. 13 in which the high-frequency-enhanced sub-frames and high-frequency-suppressed sub-frames are alternately output. The interpolated lines contained in each sub-frame are displayed as a signal with a reduced level.

In the resulting display image, the occurrence of blurring is reduced without impairing the brightness or contrast level. The output level to be reduced in the gain controller 105 can be set through the user input unit 108. If the output level is set to be ×0, interpolated pixels are output as black pixels, and as a result, an image reflecting the original image as an interlace image is displayed. On the other hand, if the output level is set to be ×1, the pixel values of the interpolated pixels are output as they are, and as a result, a progressive image generated by IP conversion is displayed.

The above-described embodiment has been discussed in the context that an image at 60 Hz is input, the number of sub-frames to be divided is n=2, and an image at 120 Hz is output. However, a combination of input and output images is not restricted to this example. Another combination may be set as long as sub-frames are set on the basis of an original frame such that the sub-frames are switched at a rate higher than the original image, and the sub-frames are displayed alternately as high-frequency-enhanced sub-frames and high-frequency-suppressed sub-frames.

For example, the number n of frames to be divided may be set to be 4, and four sub-frames a1, a2, a3, and a4 at 240 Hz may be generated from one 60-Hz original frame a. Then, for the four sub-frames, high-frequency-enhanced sub-frames and high-frequency-suppressed sub-frames may be alternately set as:

a1: high-frequency-enhanced sub-frames;

a2: high-frequency-suppressed sub-frames;

a3: high-frequency-enhanced sub-frames; and a4: high-frequency-suppressed sub-frames.

Then, the sub-frames may be output at intervals of 1/240 sec.

The above-described embodiment has been discussed in the context of an LCD as a display apparatus. However, another frame-hold-type display apparatus, such as an organic EL display, may be used. In this case, advantages similar to those obtained by an LCD can be obtained. That is, the occurrence of blurring phenomenon can be reduced without impairing the brightness or contrast level.

A series of processing operations discussed in the specification can be executed by hardware or software or a combination thereof. If software is used, a program on which a processing sequence is recorded is installed into a memory within a computer built in dedicated hardware or into a general-purpose computer that can execute various types of processing operations, and is then executed.

A program may be recorded beforehand on a hard disk or a read only memory (ROM). Alternatively, the program may be stored (recorded) temporarily or permanently in a removable recording medium, such as a flexible disk, a compact disc read only memory (CD-ROM), a magneto-optical (MO) disk, a digital versatile disc (DVD), a magnetic disk, or a semiconductor memory. The removable recording medium can be provided as so-called "package software".

The program may be installed into a computer from the above-described removable recording medium. Alternatively, the program may be transferred from a download site to a computer wirelessly or wired units via a network, such as a local area network (LAN) or the Internet. Then, the computer can receive the transferred program and installs it on a recording medium, such as a built-in hard disk.

The processing operations described in the specification may be executed in chronological order discussed in the specification. Alternatively, they may be executed in parallel or individually according to the processing performance of an apparatus executing the processing or according to the necessity. In the specification, the system is a logical set of a plurality of devices, and it is not essential that the devices be in the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus for performing image display processing, comprising:

an interlace-to-progressive converter configured to perform signal conversion processing for receiving an interlace signal to convert the interlace signal into a progressive signal including information on interpolated pixels generated by interpolation processing;

a frame controller configured to divide an input image frame in a time-division manner to generate a plurality of sub-frames;

a high-frequency-enhanced sub-frame generator configured to perform filtering processing on the plurality of sub-frames generated by the frame controller to generate high-frequency-enhanced sub-frames;

a high-frequency-suppressed sub-frame generator configured to perform filtering processing on the plurality of sub-frames generated by the frame controller to generate high-frequency-suppressed sub-frames;

a first output controller configured to alternately output the high-frequency-enhanced sub-frames generated by the high-frequency-enhanced sub-frame generator and the high-frequency-suppressed sub-frames generated by the high-frequency-suppressed sub-frame generator;

a gain controller configured to adjust an output level of sub-frame images corresponding to the high-frequency-enhanced sub-frames and the high-frequency-suppressed sub-frames output from the first output controller;

a second output controller configured to receive an output from the first output controller and an output from the gain controller to output an output-level-adjusted signal output from the gain controller as a signal corresponding to the interpolated pixels generated by the interlace-to-progressive converter and to output an output-level non-adjusted signal output from the first output controller as an original pixel signal other than the signal corresponding to the interpolated pixels; and a display unit configured to perform frame-hold-type display processing and to alternately display the high-frequency-enhanced sub-frames and the high-frequency-suppressed sub-frames output from the second output controller.

2. The image display apparatus according to claim 1, further comprising:

a user input unit configured to input a setting value for setting the output level to be adjusted in the gain controller, wherein the gain controller adjusts the output level of the sub-frame images in accordance with the setting value input through the user input unit.

3. The image display apparatus according to claim 1, wherein the gain controller adjusts the output level of the sub-frame images in a range from ×0 to ×1.

4. The image display apparatus according to claim 1, wherein the high-frequency-enhanced sub-frame generator includes a high-pass filter and an add processor, and outputs, as the high-frequency-enhanced sub-frames, an addition result obtained by adding sub-frames obtained by performing filtering on the plurality of sub-frames with the high-pass filter to the sub-frames not subjected to the filtering.

5. The image display apparatus according to claim 1, wherein the high-frequency-suppressed sub-frame generator includes a low-pass filter and outputs a result of performing filtering on the plurality of sub-frames with the low-pass filter as the high-frequency-suppressed sub-frames.

6. The image display apparatus according to claim 1, wherein the high-pass filter forming the high-frequency-enhanced sub-frame generator and the low-pass filter forming the high-frequency-suppressed sub-frame generator each have a filtering characteristic such that, among frequency components, a proportion of the frequency components allowed to pass through the high-pass filter or the low-pass filter is equal to a proportion of the frequency components blocked by the low-pass filter or the high-pass filter.

7. The image display apparatus according to claim 1, wherein the frame controller divides a 60-Hz image frame as an input image into two sub-frames in a time-division manner to generate 120-Hz image sub-frames, the high-frequency-enhanced sub-frame generator and the high-frequency-suppressed sub-frame generator generate the high-frequency-enhanced sub-frames and the high-frequency-suppressed sub-frames, respectively, corresponding to the 120-Hz image sub-frames generated by the frame controller, and the display unit alternately displays the high-frequency-enhanced sub-frames and the high-frequency-suppressed sub-frames at intervals of 1/120 sec.

8. The image display apparatus according to claim 1, wherein the display unit is a frame-hold-type display unit that performs frame-hold-type display utilizing a liquid crystal display or an organic electroluminescence display.

9. A signal processing apparatus for generating an image signal, comprising:

an interlace-to-progressive converter configured to perform signal conversion processing for receiving an interlace signal to convert the interlace signal into a progressive signal including information on interpolated pixels generated by interpolation processing;

a frame controller configured to divide an input image frame in a time-division manner to generate a plurality of sub-frames;

a high-frequency-enhanced sub-frame generator configured to perform filtering processing on the plurality of sub-frames generated by the frame controller to generate high-frequency-enhanced sub-frames;

a high-frequency-suppressed sub-frame generator configured to perform filtering processing on the plurality of sub-frames generated by the frame controller to generate high-frequency-suppressed sub-frames;

a first output controller configured to alternately output the high-frequency-enhanced sub-frames generated by the high-frequency-enhanced sub-frame generator and the high-frequency-suppressed sub-frames generated by the high-frequency-suppressed sub-frame generator;

a gain controller configured to adjust an output level of sub-frame images corresponding to the high-frequency-enhanced sub-frames and the high-frequency-suppressed sub-frames output from the first output controller; and a second output controller configured to receive an output from the first output controller and an output from the gain controller to output an output-level-adjusted signal output from the gain controller as a signal corresponding to the interpolated pixels generated by the interlace-to-progressive converter and to output an output-level non-adjusted signal output from the first output controller as an original pixel signal other than the signal corresponding to the interpolated pixels.

10. The signal processing apparatus according to claim 9, wherein the gain controller adjusts the output level of the sub-frame images in accordance with a setting value input through a user input unit.

11. The signal processing apparatus according to claim 9, wherein the gain controller adjusts the output level of the sub-frame images in a range from ×0 to ×1.

12. The signal processing apparatus according to claim 9, wherein the high-frequency-enhanced sub-frame generator includes a high-pass filter and an add processor, and outputs, as the high-frequency-enhanced sub-frames, an addition result obtained by adding sub-frames obtained by performing filtering on the plurality of sub-frames with the high-pass filter to the sub-frames not subjected to the filtering.

13. The signal processing apparatus according to claim 9, wherein the high-frequency-suppressed sub-frame generator includes a low-pass filter and outputs a result of performing filtering on the plurality of sub-frames with the low-pass filter as the high-frequency-suppressed sub-frames.

14. An image processing method for performing image processing in an image display apparatus, comprising the steps of:

performing signal conversion processing for receiving an interlace signal to convert the interlace signal into a progressive signal including information on interpolated pixels generated by interpolation processing;

dividing an input image frame in a time-division manner to generate a plurality of sub-frames;

generating high-frequency-enhanced sub-frames by performing filtering processing on the plurality of sub-frames;

generating high-frequency-suppressed sub-frames by performing filtering processing on the plurality of sub-frames;

alternately outputting the high-frequency-enhanced sub-frames and the high-frequency-suppressed sub-frames;

adjusting an output level of sub-frame images corresponding to the high-frequency-enhanced sub-frames and the high-frequency-suppressed sub-frames; and receiving an output as a result of alternately outputting the high-frequency-enhanced sub-frames and the high-frequency-suppressed sub-frames and an output of the sub-frame images having an adjusted output level to output an output-level-adjusted signal as a signal corresponding to the interpolated pixels and to output an output-level non-adjusted signal as an original pixel signal other than the signal corresponding to the interpolated pixels.

15. A computer program product, embodied on a non-transitory computer readable medium, allowing an image display apparatus to perform image processing, the image processing comprising the steps of:

performing signal conversion processing for receiving an interlace signal to convert the interlace signal into a progressive signal including information on interpolated pixels generated by interpolation processing;

dividing an input image frame in a time-division manner to generate a plurality of sub-frames;

generating high-frequency-enhanced sub-frames by performing filtering processing on the plurality of sub-frames;

generating high-frequency-suppressed sub-frames by performing filtering processing on the plurality of sub-frames;

alternately outputting the high-frequency-enhanced sub-frames and the high-frequency-suppressed sub-frames;

adjusting an output level of sub-frame images corresponding to the high-frequency-enhanced sub-frames and the high-frequency-suppressed sub-frames; and receiving an output as a result of alternately outputting the high-frequency-enhanced sub-frames and the high-frequency-suppressed sub-frames and an output of the sub-frame images having an adjusted output level to output an output-level-adjusted signal as a signal corresponding to the interpolated pixels and to output an output-level non-adjusted signal as an original pixel signal other than the signal corresponding to the interpolated pixels.

* * * * *